United States Patent [19]

Thompson et al.

[11] Patent Number: 5,682,099
[45] Date of Patent: Oct. 28, 1997

[54] METHOD AND APPARATUS FOR SIGNAL BANDPASS SAMPLING IN MEASUREMENT-WHILE-DRILLING APPLICATIONS

[75] Inventors: Larry W. Thompson, Willis; MacMillan M. Wisler, Kingwood; David Mark Schneider, Spring, all of Tex.

[73] Assignee: Baker Hughes Incorporated, Houston, Tex.

[21] Appl. No.: 478,171

[22] Filed: Jun. 7, 1995

Related U.S. Application Data

[63] Continuation-in-part of Ser. No. 214,343, Mar. 14, 1994, Pat. No. 5,574,374, Ser. No. 214,916, Mar. 14, 1994, and Ser. No. 283,933, Aug. 1, 1994.

[51] Int. Cl.$^6$ ............... G01V 3/26; G06G 7/76
[52] U.S. Cl. ............................ 324/338; 364/422
[58] Field of Search ........... 324/201, 239–243, 324/228, 225, 323, 332, 341, 345, 346; 364/422

[56] References Cited

U.S. PATENT DOCUMENTS

| | | | |
|---|---|---|---|
| 4,455,529 | 6/1984 | Sinclair | 324/339 |
| 4,499,422 | 2/1985 | Sinclair | 324/339 |
| 4,514,809 | 4/1985 | Johnson, Jr. et al. | 324/366 X |
| 4,720,681 | 1/1988 | Sinclair | 324/339 |
| 4,968,940 | 11/1990 | Clark et al. | 324/338 |

Primary Examiner—Sandra L. O'Shea
Assistant Examiner—Roger Phillips
Attorney, Agent, or Firm—Madan & Morris, PLLC

[57] ABSTRACT

A logging apparatus is provided for use in a wellbore for measuring an attribute of at least one of the wellbore and a surrounding formation, when coupled to a wellbore tubular expended in the wellbore. The logging apparatus includes a housing, at least one transmitter, and at least one receiver. The transmitter is carried by the housing and is individually and selectively operable for producing electromagnetic interrogating signal at selected interrogation frequency for passage to the wellbore and surrounding formation. The receiver is carried by the housing in a selected position relative to the transmitter, and is tuned to receive electromagnetic signals at the interrogation frequency to the exclusion of other frequencies. A portion of at least one of the wellbore, and surrounding formation has an attribute value which can be derived from at least one of amplitude attenuation of electromagnetic interrogating signal as determined from measurements of the electromagnetic interrogating signals taken through the receiver, and phase shift of electromagnetic interrogating signal as determined from measurements from electromagnetic signal taken through the receiver. The apparatus further includes means for sampling signals from the receiver or receivers at a sampling frequency which is less than the interrogation frequency. A controller member is provided for selectively energizing the transmitters and for selectively obtaining measurements of the electromagnetic interrogating signal with the receivers, and determining an accurate measure of the attribute value.

74 Claims, 27 Drawing Sheets

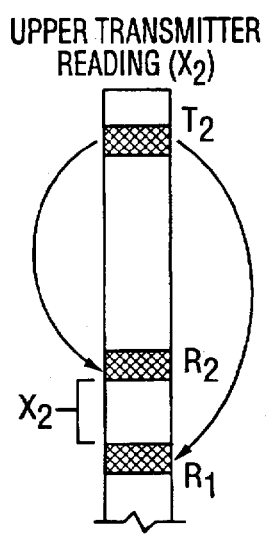
FIG. 5AA
UPPER TRANSMITTER READING ($X_2$)
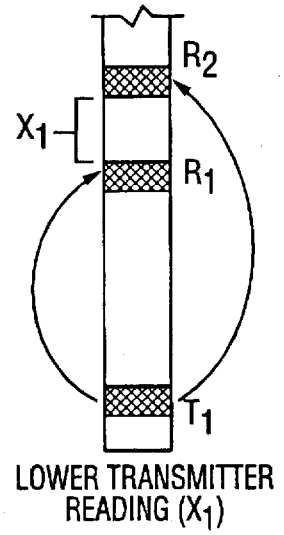
FIG. 5AB
LOWER TRANSMITTER READING ($X_1$)
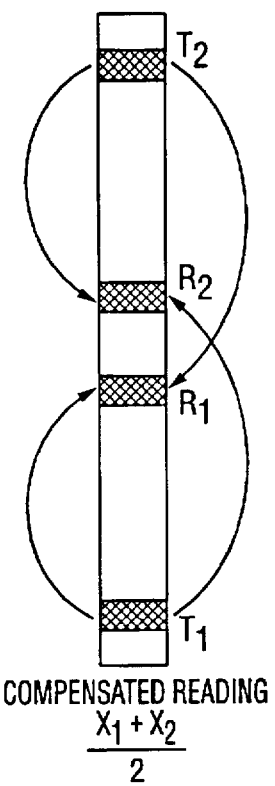
FIG. 5AC
COMPLETE TOOL
COMPENSATED READING
$$\frac{X_1 + X_2}{2}$$
FIG. 5BA
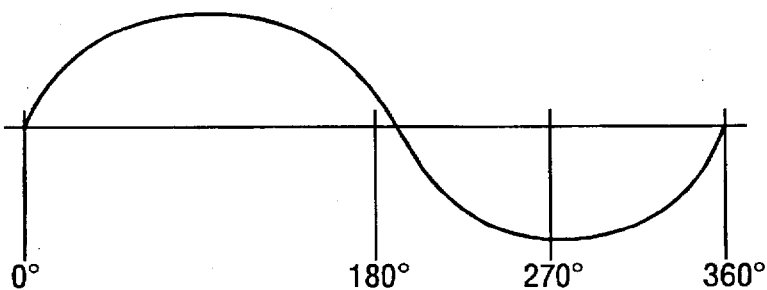

METHOD AND APPARATUS FOR SIGNAL BANDPASS SAMPLING IN MEASUREMENT-WHILE-DRILLING APPLICATIONS

BACKGROUND OF THE INVENTION

1. Cross-Reference to Related Application

This application is a continuation-in-part of the following patent applications, which are incorporated herein by reference as if fully set forth:

(1) Ser. No. 08/214,343, filed Mar. 14, 1994 and entitled "Method and Apparatus for Digitally Calibrating and Controlling a Wellbore Measurement Tool", now U.S. Pat. No. 5,574,374;

(2) Ser. No. 08/214,916, filed Mar. 14, 1994, and entitled "Method and Apparatus for Eliminating the Influence of Mutual Coupling Errors on Logging-While-Drilling Measurements and for Borehole Calipering Operations"; and (3) Ser. No. 08/283,933, filed Aug. 1, 1994, and entitled "Method and Apparatus for Interrogating a Borehole".

2. Description of the Prior Art

Currently, the oil and gas industry is experiencing tremendous economic pressure to minimize or eliminate costs associated with the exploration, drilling and production of oil and gas wells. This is especially true since prices have remained substantially constant for long intervals. This forces the oil and gas companies and their service companies to compete by increasing efficiencies and reducing costs. One important trend in the oil and gas industry is the move toward smaller (that is, "narrower") boreholes. Significant cost savings can be obtained if the bulky drillstring tubulars can be replaced with a narrower and lighter-weight tubular string, such as a coiled tubing or production tubing string. Another significant trend is an increase in the number of articulated boreholes. Specifically, there is a great interest in drilling substantially horizontal boreholes. Additionally, there is a significant interest in drilling articulated boreholes from offshore platforms. The trend toward smaller narrower boreholes which are more articulated means that the conventional tools utilized in drilling and producing the oil and gas wells must be narrower and more easily maneuvered in highly articulated boreholes.

It is also more common for these boreholes to be drilled utilizing a drillstring which includes a logging-while-drilling subassembly and a mud pulse telemetry subassembly. These subassemblies are utilized to perform logging operations during drilling, in order to obtain information about the borehole and surrounding formation and to telemeter that data to the surface where they are analyzed and utilized in real time during the drilling operations to intelligently control the well site activities. There is accordingly some pressure on the service providers to manufacture logging and transmission subassemblies which may be utilized in the narrower, and more highly articulated, wellbores.

In the art prior to the digital wave propagation MWD resistivity tools, phase difference between signals received at two antennas was measured directly by a method such as the zero crossing method which has been described. The amplitude of each signal is measured with mostly analog voltage sensitive circuitry. Given the state of the art of available electronics components 5 or 10 years ago, extremely accurate measurement of 2 MHz signal components was very difficult, especially in a wellbore environment. Absolute measurements of signal components could not be made over the temperature range required, in the space available, to the accuracy required, and over the dynamic range required. The best that could be done is to measure phases and amplitudes of the two received signals relative to one another, i.e., phase difference and amplitude ratio, because the older, mostly analog, components were limited largely by temperature stability and dynamic range. Although the receiver voltages are measured independently with the older, mostly analog, electronics their accuracy is such that only voltages relative to one another are accurate enough to use in a resistivity measurement. The absolute measurements of receiver voltage may vary 50 dB in a 2 MHz resistivity tool as the resistivity of the formation goes from one extreme to the another. However, the voltage differences between the two receivers on the same tool will vary only 10 dB over the same resistivity range, a much smaller dynamic range. In the past, even laboratory instruments which measured RF signals accurately over large dynamic ranges had to be temperature stabilized. The new, mostly digital, electronics allow us to measure the components of the received signals over the entire 50 dB dynamic range much more accurately and despite huge variations in temperature. In addition, the digital electronics allows us to measure lower frequency RF fields, i.e., 400 KHz, in the same tool to the accuracy required for formation evaluation quality resistivity tools; something that was unattainable with older electronics.

The components that are measured directly with the digital electronics are the absolute amplitudes of the real and imaginary part, or equivalently, the in-phase and out-of-phase components of the received signal relative to the transmitted signal. The older electronics directly measured the phase difference and attenuation between received signals. To show how the digital electronics operate Appendix 1 contains math behind the quadrature sampling technique used in our tools. The technique described may be used for bandpass sampling as well as for sampling at greater than the Nyquist frequency. The factor n which first appears in equation 3 is set to zero for sampling at 4 times the signal frequency. As the measurement is made two numbers are obtained for each transmitter to each receiver at each frequency. Those numbers are the odd and even averages shown in equations 12 and 13. The even average (equation 12) is proportional to the amplitude $A_o$ times the cosine of the phase $\phi_o$, and is defined as the in-phase, or in exponential notation, the real part of the received signal. The odd average (equation 12) is proportional to the amplitude $A_o$ times the sine of the phase $\phi_o$, and is defined as the out-of-phase, or imaginary part of the received signal. Note that the amplitude and phase of the signal must be calculated from these numbers (equations 14 and 15) if they are to be used. Since real and imaginary parts are directly measured in the new electronics it is natural to transform them directly to resistivity and leave out the transformation to phase and amplitude in the processing. This would, of course, require that the real and imaginary parts be mapped directly to resistivity.

SUMMARY OF THE INVENTION

It is one objective of the present invention to provide a method and apparatus for logging in a wellbore which reduces the number of electronic components which are required by prior art logging devices, and thus which reduces the housing requirements for the electronics, and thereby allowing the manufacture and use of more compact logging tools which are both narrower and shorter that prior art logging tools.

It is another and more specific objective of the present invention to provide a method and apparatus for logging in a wellbore in which the logging electronics are utilized to directly digitize the incoming signals, and which thus does not require the use of a heterodyning circuit and its associated mixer and oscillator circuit components.

It is yet another objective of the present invention to provide a method and apparatus for logging in a wellbore in which the reception circuitry of the logging tool is simplified and minimized as compared to prior art logging tools, by eliminating heterodyning circuit components in favor of circuitry which is utilized to directly digitize the incoming logging signals at a sampling frequency which is much less than the Nyquist frequency which is associated with the incoming logging signals.

The present invention eliminates the conventional mixer and local oscillator circuit components which are found in prior art logging devices. This is accomplished by directly digitizing the incoming logging signal at a frequency which is much lower that the frequency of the incoming signal. This reduces the size of the electronics. The direct digitization of the incoming signal is accomplished preferably utilizing either an analog-to-digital converter or an analog-to-digital converter in combination with a sample-and-hold circuit. The output of the digitizing circuitry is provided as an input to a processor, preferably after being passed through a digital signal processor, where the phase and amplitude are analyzed. Phase shift may be determined relative to another receiver input, or relative to a reference oscillator which is preferably synchronized to signal generation circuitry such as the transmitter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5AA, 5AB and 5AC is a schematic depiction of the operation of the transmitting and receiving antennas;

DETAILED DESCRIPTION OF THE INVENTION

1. Overview of Measurement-While-Drilling

Figure 1A:
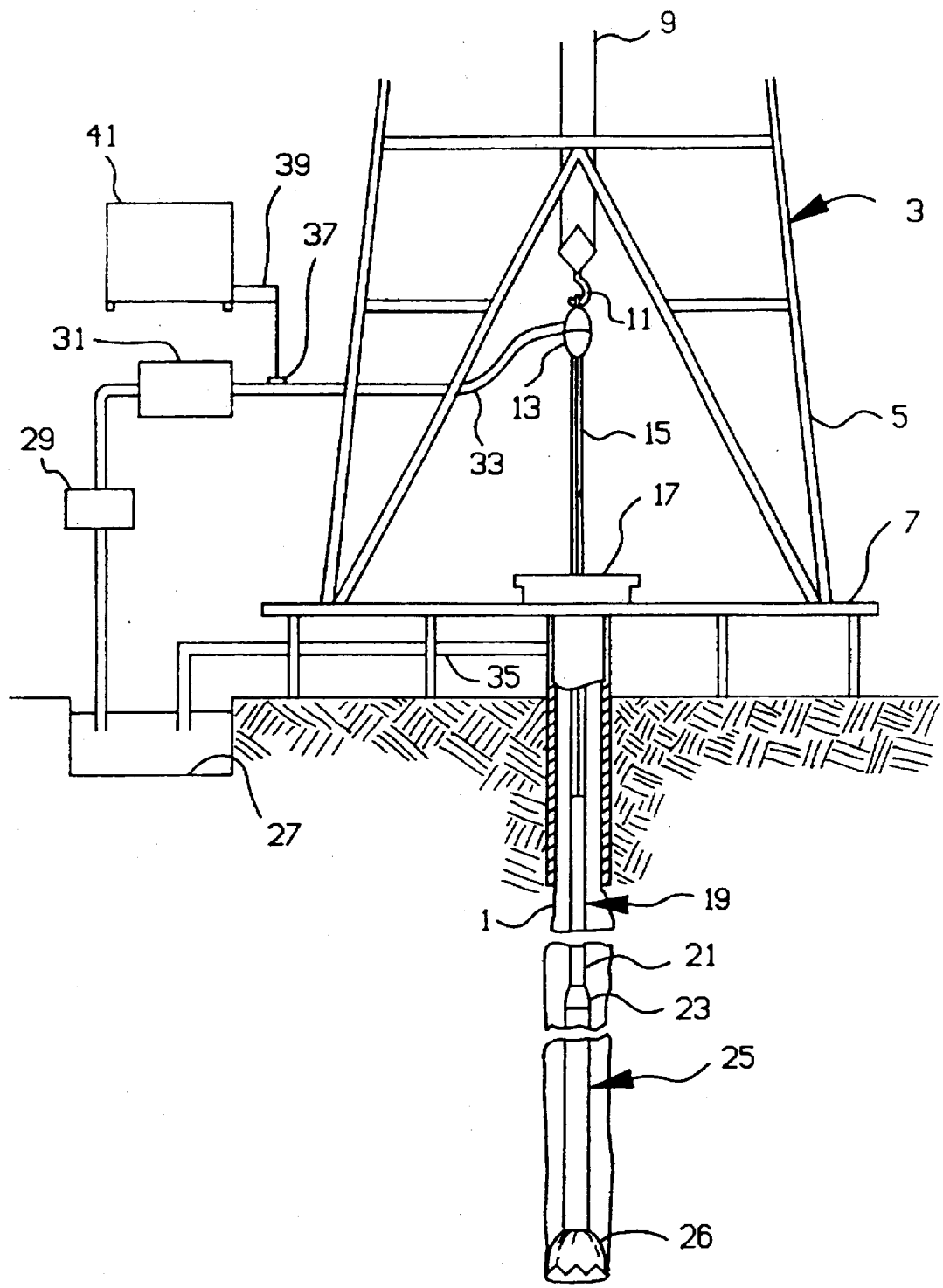
FIG. 1A provides a simplified perspective view and partial longitudinal section view of a measurement-while-drilling system utilized during drilling operations.

With reference to FIG. 1A, there will now be described an overall simultaneous drilling and logging system that incorporates an electromagnetic wave propagation resistivity measurement system according to this invention which utilizes a bandpass sampling technique.

A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud" as it is commonly called) is circulated from a mud pit 27 through a mud pump 29, past a desurger 31, through a mud supply line 33, and into swivel 13. The drilling mud flows down through the kelly joint and an axial central bore in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before it returns to the mud pit.

The overall system of FIG. 1A uses mud pulse telemetry techniques to communicate data from downhole to the surface while drilling operations take place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More, which is incorporated herein by reference as if fully set forth, mud pulse telemetry techniques provide for communicating data to the surface about numerous downhole conditions sensed by well logging transducers or measurement systems that ordinarily are located on and within the drill collar nearest the drill bit. The mud pulses that define the data propagated to the surface are produced by equipment within the intermediate sub. Such equipment typically comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including circuits forming part of the preferred embodiment of this invention. As an alternative or supplemental source of electrical power, batteries may be provided, particularly as a back-up for the turbine-driven generator.

A measurement system embodying this invention includes electronics contained in electronics housings contained within measurement tubular 25, and contains elements arranged in recesses or "necked-down" portions of the tubular steel housing of measurement tubular 25. Some of these elements of measurement tubular 25 include upper transmitting antenna, lower transmitting antenna, and intermediate receiving antennas, all of which are carried about an exterior surface of measurement tubular 25, and which are utilized to interrogate the borehole and surrounding formation, as will be discussed in greater detail herebelow.

2. Possible Antenna Configurations

Figures 1B, 1C, 1D:
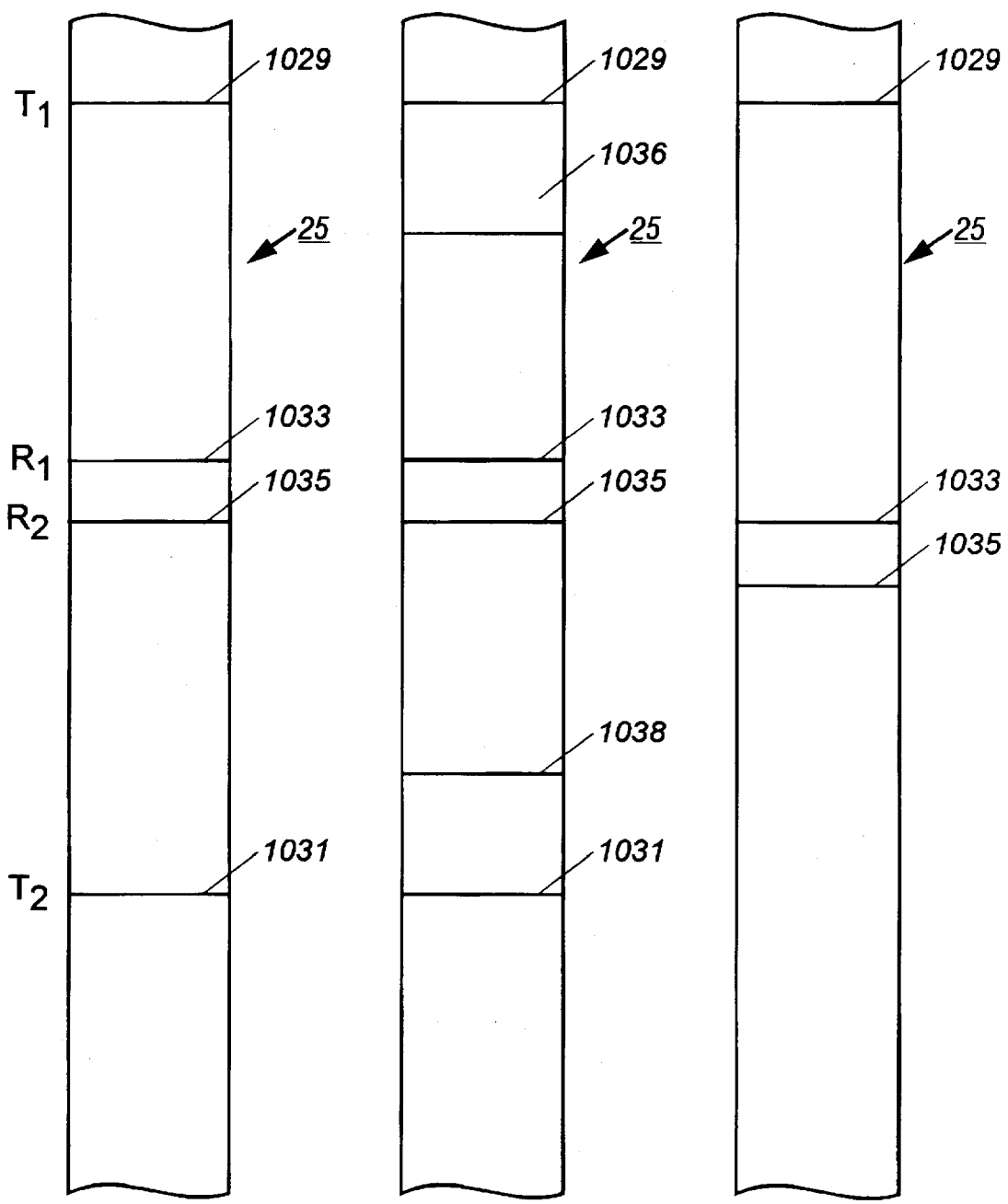
FIGS. 1B, 1C, and 1D provide schematic views of possible antenna configurations.

FIGS. 1B, 1C, and 1D depict in simplified schematic form several possible antenna configurations which can be utilized in accordance with the teachings of the present invention. The antenna configuration of FIG. 1B is a dual transmitter, dual receiver antenna configuration which includes upper transmitting antenna 1029 located at an upper portion of measurement tubular 25, lower transmitting antenna 1031, which is located at a lower portion of measurement tubular 25, and intermediate receiving antennas 1033, 1035. FIG. 1C depicts another antenna configuration in accordance with the present invention and includes upper transmitting antennas 1029, 1036 which are located at an upper portion of measurement tubular 25, lower transmitting antennas 1031, 1038 which are located at a lower portion of measurement tubular 25, and intermediate receiving antennas 1033, 1035. Yet another configuration which is possible in accordance with the present invention is depicted in FIG. 1D. This configuration includes only a single transmitting antenna, such as upper transmitting antenna 1029, and two or more receiving antennas 1033, 1035. This configuration is commercially practical as a direct result of the teachings of the present invention, as will be discussed in greater detail herebelow.

3. Antenna Construction

Figure 2A:
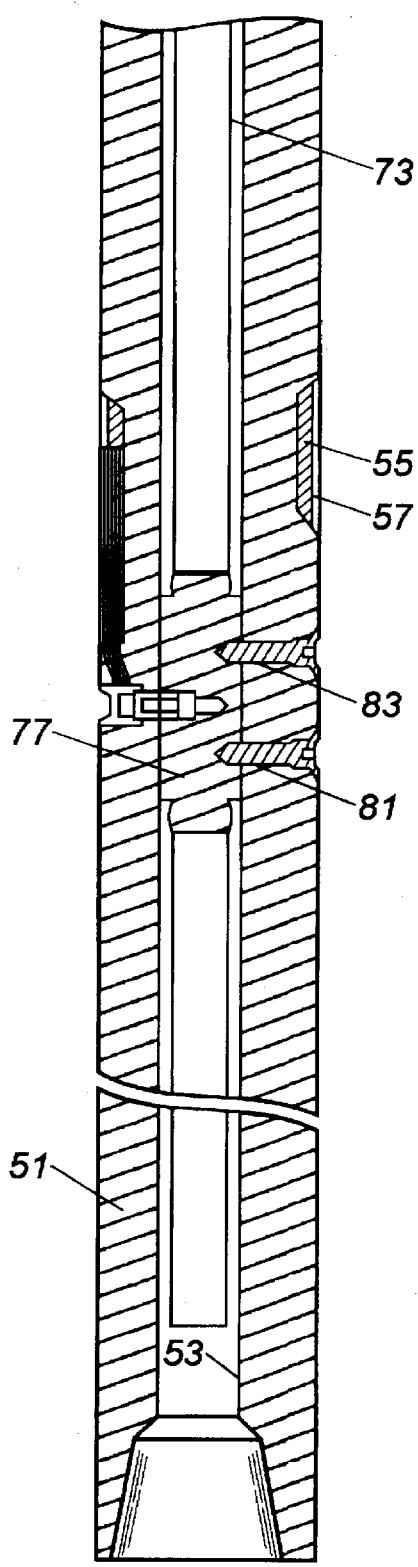
FIGS. 2A and 2B provide a longitudinal section view of a dual transmitter, dual receiver logging-while-drilling tool, and in particular depicts antenna construction and connection to receiver and/or transmitter subassemblies.
Figure 2B:
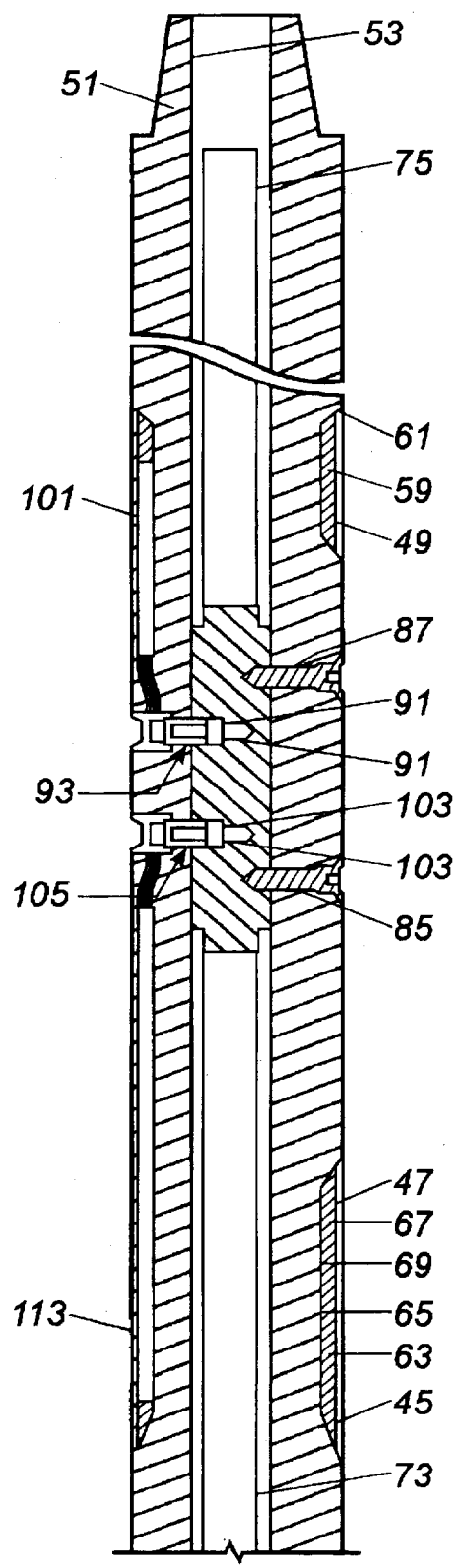

FIGS. 2A and 2B provide a longitudinal section view of measurement tubular 25 for a dual transmitter, dual receiver logging apparatus.

A tubular steel housing 51 is provided. A conductor 55 (not shown in this figure) is part of a first transmitting antenna assembly which is encapsulated in antenna-insulating sleeve 43 that surrounds a circumferential recess 57 in tubular steel housing 51. A conductor 59 (not shown in this figure) is part of a second transmitting antenna assembly which is encapsulated in antenna-insulating sleeve 49 that surrounds a circumferential recess 61 in tubular steel housing 51. A conductor 63 is part of a first receiving antenna assembly which is encapsulated in antenna-insulating sleeve 45 that surrounds a circumferential recess 65 in tubular steel housing 51. A conductor 67 is part of a second receiving antenna assembly which is encapsulated in antenna-insulating sleeve 47 that surrounds a circumferential recess 69 in tubular steel housing 51.

The ring-shaped portion of the collar that separates recess 65 from recess 69 provides for de-coupling between the first and the second receiving antenna assemblies. An alternative arrangement involves a single recess for both the first and second receiving antenna assemblies. In the alternative arrangement, the receiving antenna assemblies can be spaced closer together or farther apart.

Each antenna-insulating sleeve is made of multiple layers including an outer layer of nitrile rubber, a material which is sufficiently durable to protect the encapsulated antenna coil from wear despite the adverse conditions involved in a drilling operation, and provides adequate electrical insulation despite the hydrostatic pressures involved in the drilling operation. A suitable way to make each sleeve involves several steps including wrapping around the recess a durable fiberglass of the type that is used in replaceable insulating sleeves for MWD subs. Then, portions of the fiberglass wrappings are cut away to provide circumferential and longitudinal grooves for conductors of the antenna assembly and to provide a recess for a junction box. After insertion of the components of the antenna assembly, the nitrile rubber is applied.

Preferably, in a dual-transmitter, dual receiver tool, the axial spacing from conductor 55 of the first transmitting antenna assembly to conductor 63 of the first receiving antenna assembly is 28 inches, from conductor 63 to conductor 67 of the second receiving antenna assembly is 6 to 10 inches, and from conductor 67 to conductor 59 of the second transmitting antenna assembly is 28 inches. In the above-mentioned alternative arrangement in which both receiving antenna assemblies are in a single recess, the spacings suitably are 30 inches, 6 inches, and 30 inches. Close spacing of receiving antennas provides good vertical resolution which allows thin beds in the formation to be identified; however, the closer the spacing on receiving antennas the greater the impact of magnetic mutual coupling.

Within steel housing 51, there are arranged three pressure-sealed electronics housings 71, 73, and 75, together with supporting blocks 77 and 79. Each supporting block engages the interior cylindrical surface of tubular steel housing 51. Supporting blocks 77 and 79 are fixed in place by sealed anchor bolts 81, 83, 85, and 87.

Figure 2C:
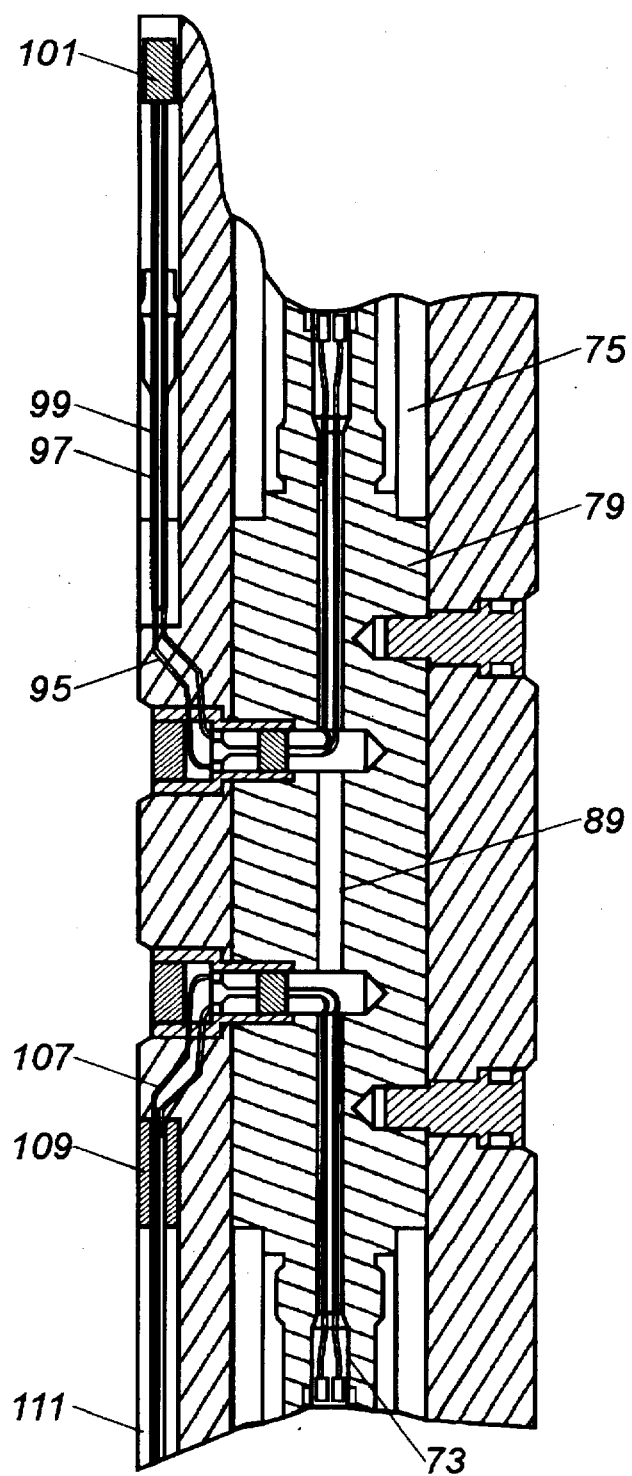
FIG. 2C provides a detail view of a portion of the antenna construction of FIGS. 2A and 2B and connection to receiver and/or transmitter subassemblies.

As shown in the enlarged view of FIG. 2C, supporting block 79 has an axial bore 89 that serves as section of a conduit assembly for conductors that extend from circuitry in electronic housings 73 and 75. Axial bore 89 communicates with openings 91 (FIG. 2B) in a pressure-sealed, generally radially-extending port connector assembly 93 that serves as a section of the conduit assembly for conductors that interconnect circuitry within electronics housings 75 and the second transmitting antenna assembly. Other sections of this conduit assembly are a port tube 95, a tubing length adjuster 97, and tubing 99 that terminates in a junction box 101.

Axial bore 89 (in FIG. 2C) also communicates with openings 103 (FIG. 2B) in another pressure-sealed, generally radially-extending port connector assembly 105 that serves as a section of the conduit assembly for conductors that interconnect circuitry in electronics housings 73 and the first and second receiving antenna assemblies. Other sections of this conduit assembly are a port tube 107, a tubing length adjuster 109, and tubing 111 that terminates in a junction box.

Figure 2D:
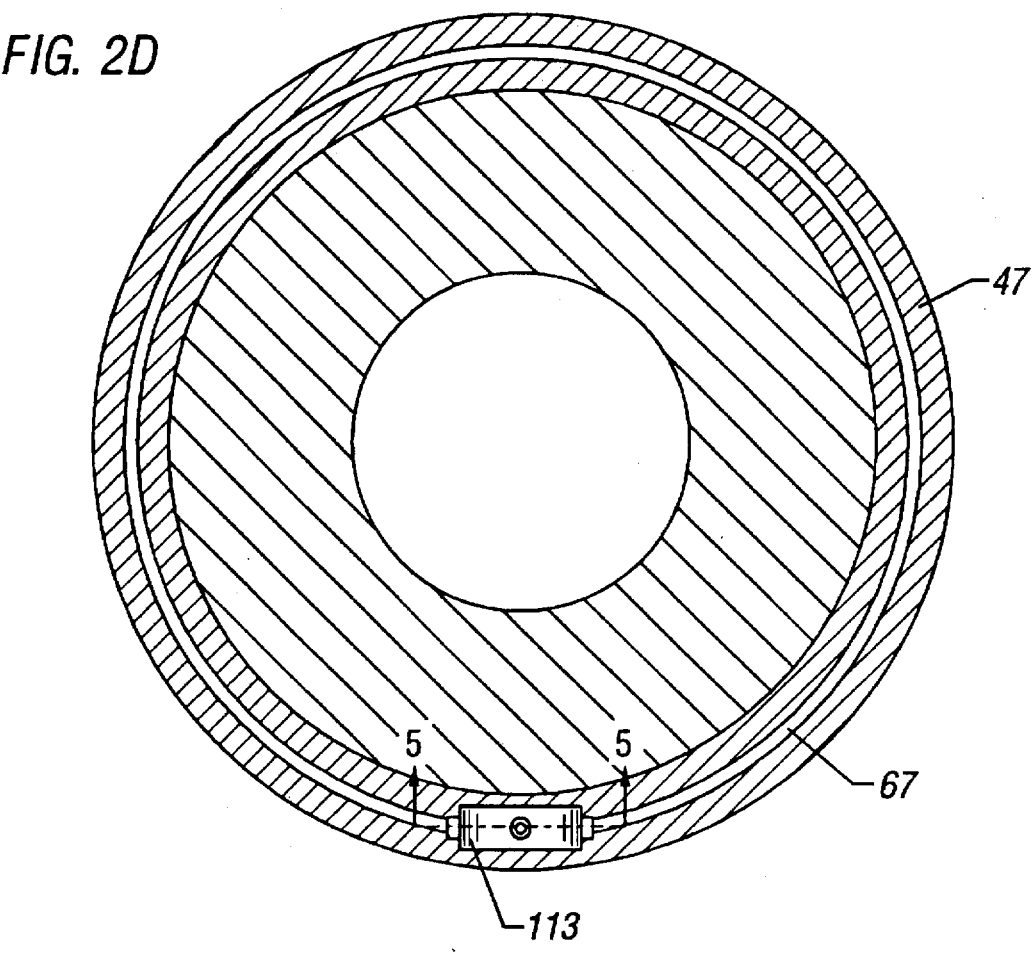
FIG. 2D is a cross-section view of the antenna construction of FIGS. 2A, 2B, and 2C.
Figure 2E:
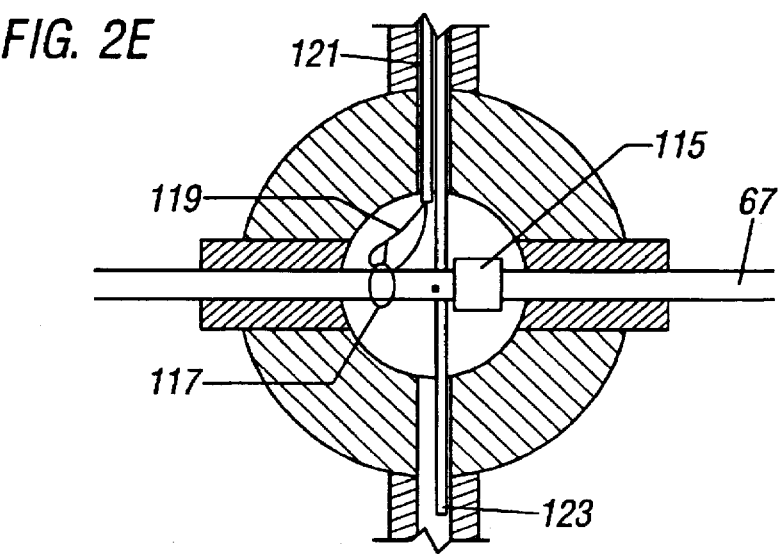
FIG. 2E is a detail view of section 5—5 of FIG. 2D.

With reference to FIGS. 2D and 2E, there will now be described the construction of the second receiving antenna assembly. Conductor 67 and a tuning capacitor 115 are interconnected to define a single-turn, tuned receiving antenna. In combination with a conductor forming a one-turn loop of 6½ inch diameter, tuning capacitor 115 makes the receiving antenna highly sensitive in the frequency region embracing 2 Mhz. This is so because the capacitive reactance is equal (but opposite in phase from) the inductive reactance and therefore the loop impedance is minimum (and essentially resistive). In operation, an alternating current is induced in the loop circuit defined by conductor 67 and capacitor 115 while an electromagnetic wave propagates through the formation. The magnitude of this alternating current depends on, among other things, the impedance of the loop circuit. At 2 Mhz, the impedance of the loop circuit is about 0.5 ohms. Within junction box 113, conductor 67 extends through the aperture of a ferrite ring 117 that defines the core of a high efficiency transformer. Conductor 67 defines the primary of the transformer. A toroidal winding 119 defines the secondary of the transformer and provides a receiver pick-up signal that is coupled to receiver circuitry via a coaxial cable 121. The first receiving antenna assembly has the same construction as the second receiving antenna assembly, and a coaxial cable 123 extends from it through junction box 113 as shown in FIG. 2E to couple the pick-up signal from the first receiving antenna assembly to receiver circuitry.

4. Alternative Tool Construction

Figure 3A:
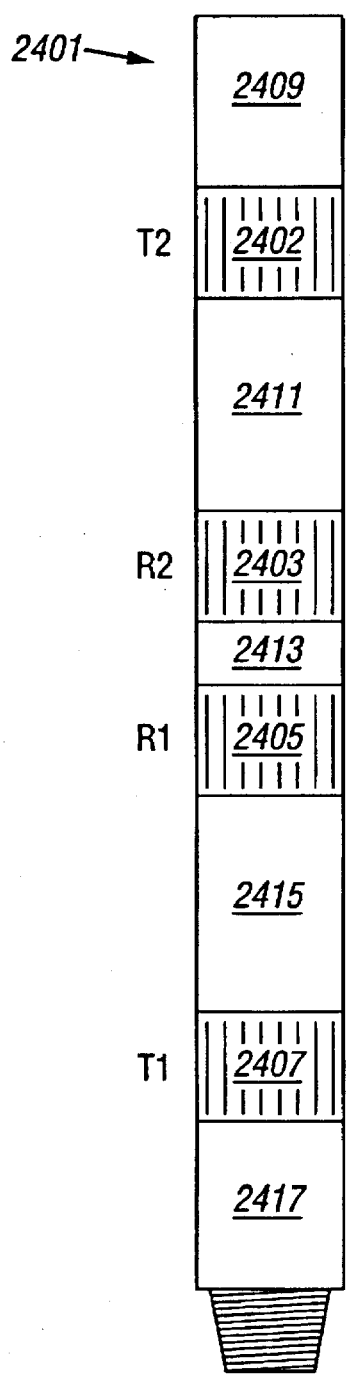
FIGS. 3AA 3AB, and 3B depict one particular embodiment of a logging tool which utilizes the present invention.
Figure 3A:
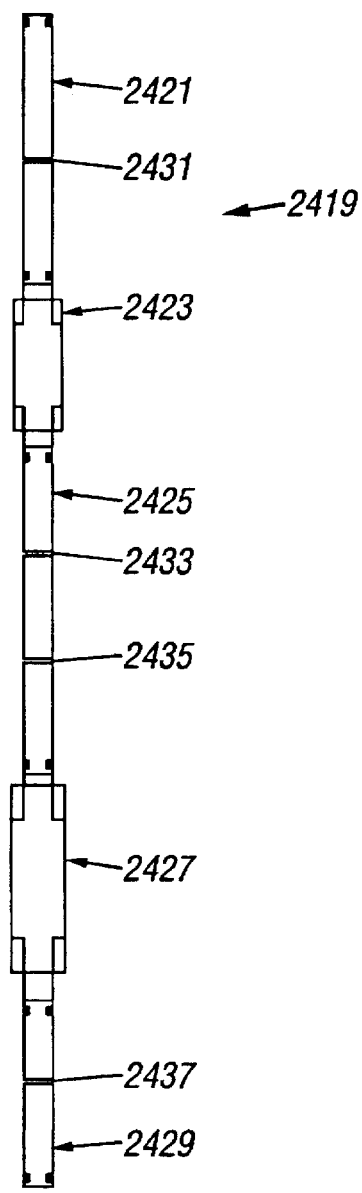
Figure 3B:
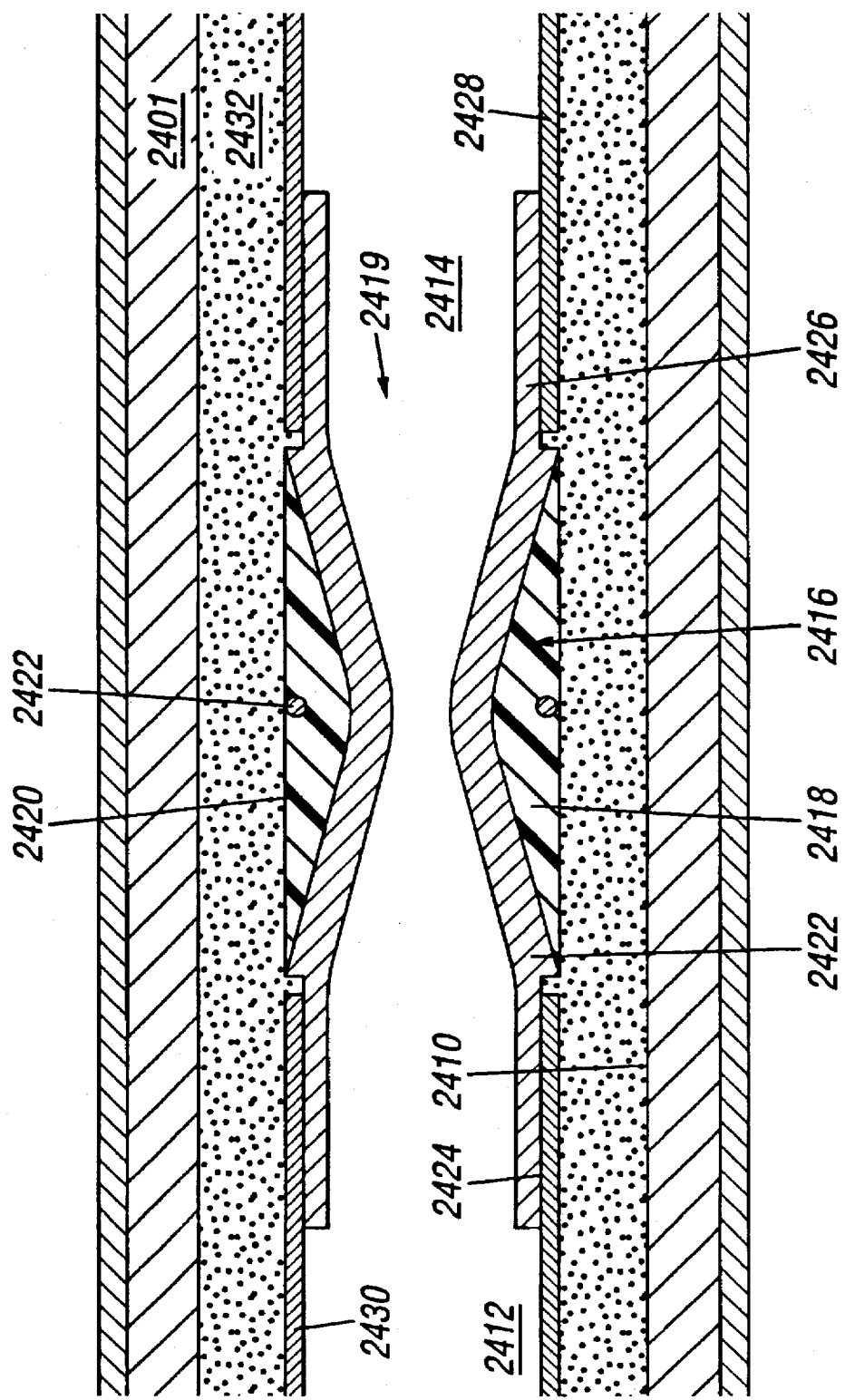

The present invention is particularly useful in "slim-hole" logging tools which are increasing in popularity. FIGS. 3AA and 3AB, 4A, 4B, 4C, and 4D depict two alternative tool slim-hole constructions which utilize the present invention. FIGS. 3A and 3B depict measurement tubular 2401 and measurement sonde 2419 which is adapted to be positioned within the central bore 2410 of measurement tubular 2401. Measurement tubular 2401 is composed substantially of steel, as are other prior art drill collars; however, measurement tubular 2401 includes four regions which include a plurality of axial slots which are disposed circumferentially about measurement tubular 2401 and which extend through the width of measurement tubular 2401, but which are filled with a poorly-conducting or non-conducting material, such as a KEVLAR (Kevlar is a registered trademark for a synthetic material which is extremely strong, but also flexible) material or such as an epoxy or ceramic material. For purposes of this disclosure, poor conductors are defined as materials which have a bulk resistivity value of greater than 0.001 Ohm-meters and less than 100 Ohm-meters. For purposes of this disclosure, non-conducting materials are defined as those materials which have bulk resistivity values which are greater than 100 Ohm-meters. Also, for purposes of this disclosure, "good" conducting materials are defined as having a resistivity of less than 0.001 ohm-meters. Prior art steel collars respond to high frequency electric and/or magnetic oscillating fields by the generation of eddy currents which dissipate the field and prevent the communication inward or outward of electric and/or magnetic oscillating fields. The tools of FIGS. 3A through 4D utilize KEVLAR-based composite materials which are poorly conducting. An example of one type of composite tubulars which are currently being utilized in the oil and gas industry are the composite drill pipe, casing pipe, and tubing pipe manufactured by Brunswick Composites, a unit of the Brunswick Technical Group, having a business and correspondence address in Lincoln, Nebr., which offers for sale composite tubulars which have a strength many times greater than that found in steel tubulars, with much less weight, and virtual immunity to corrosion. An article entitled "Developments in Composite Structures for the Offshore Oil Industry" by J. G. Williams of Conoco, Inc., published in May of 1991 at the Offshore Technology Conference, and identified by OTC No. 6579, provides a detailed statement of the current utilization of composite materials in offshore oil and gas activities. Among the numerous uses of composite materials identified in this article is the use of composite drill pipe which has demonstrated its ability to withstand the forces encountered during drilling operations. Numerous composite materials are identified in this article including composites based upon graphite, KEVLAR 29, and KEVLAR 49. In the present invention, the axial slots which are filled with non-conducting or poorly-conducting material allow for the inward and outward passage of electric and/or magnetic oscillating fields, but which prevent the passage of fluid through measurement tubular 2401. As is shown in FIGS. 3AA and 3AB, upper transmitter region 2402 includes the axial slots which allow for the inward and outward passage of electric and/or magnetic oscillating fields. Likewise, lower transmitter region 2407 includes the axial slots which allow for the inward or outward passage of electric and/or magnetic oscillating fields. Receiver regions 2403, 2405 are provided in a position intermediate the transmitter regions 2402, 2407. Receiver regions 2403, 2405 also include the axial slots filled with poorly-conducting or non-conducting material, which allow for the inward or outward passage of electric and/or magnetic oscillating fields, but may contribute strength to the collar and not allow the passage of fluid through the axial slots. The regions which contain the axial slots filled with poorly-conducting or non-conducting material are separated and surrounded by solid regions 2409, 2411, 2413, 2415, and 2417, which do not allow for the passage of electrical and/or oscillating fields, since they are composed of steel which dissipates the electrical and/or magnetic oscillating field by the formation of eddy currents.

Measurement sonde 2419 is disposed adjacent measurement tubular 2401 in the depiction of FIG. 3A. In actual use, measurement sonde 2419 is disposed within the central bore (which is depicted only in FIG. 3B) of measurement tubular 2401. Measurement sonde 2419 is composed of upper transmitter assembly and pressure housing 2421 which contains the upper transmitting antenna, receiver assembly and middle pressure housing 2425 which contain the receiving antennas, and lower transmitter assembly and pressure housing 2429 which contain the lower transmitter. Upper paddle assembly 2423 and lower paddle assembly 2427 are provided to centralize and position measurement sonde 2413 within the central bore of measurement tubular 2401. The electrical, electronic, and data processing components which cooperate to allow for the reception and transmission modes of operation are contained within the pressure housings 2421, 2425, 2427. Upper transmitter 2431 is disposed on the exterior surface of upper transmitter assembly and pressure housing 2421 and is adapted to be aligned with transmitter region 2402 when measurement sonde 2419 is positioned within the central bore of measurement tubular 2401. Lower transmitter 2437 is carried about the exterior portion of lower transmitter assembly and pressure housing 2429 and is adapted in position to be aligned with transmitter region 2407 of measurement tubular 2401 when measurement sonde 2419 is positioned within the central bore of measurement tubular 2401. Receiver antennas 2433, 2435 are carried by receiver assembly and middle pressure housing 2425 and adapted in position to align with receiver regions 2403, 2405 when measurement sonde 2419 is positioned within the central bore of measurement tubular 2401. The axial slots in measurement tubular 2401 which are filled with poorly-conducting or non-conducting material allow for the sonde-based measurement of well parameters outside the drillstring which would normally be impeded by the presence of a steel collar. The slots are constructed such that the collar of measurement tubular 2401 maintains its structural integrity necessary for drilling operations, and drilling fluids are not allowed to flow through the axial slots since the non-conducting or poorly-conducting materials are solid fluid-impermeable materials.

FIG. 3B is a partial longitudinal section view of measurement sonde 2419 disposed within central bore 2410 of measurement tubular 2401. As is shown, electronics cavities 2412, 2414 are provided above and below antenna section 2416. Antenna section 2416 includes an antenna cavity 2418 which is filled with fiberglass 2420, which surrounds antenna wire 2422. Antenna section includes antenna housing sleeve 2422 which includes upper lip 2424 and lower lip 2426 which mate with mandrel 2428 and mandrel 2430 of measurement sonde 2419. As is shown, mud flows between measurement tubular 2401 and measurement sonde 2419. The electronics contained within electronics cavities 2412, 2428 are protected from the mud flow.

Figure 4A:
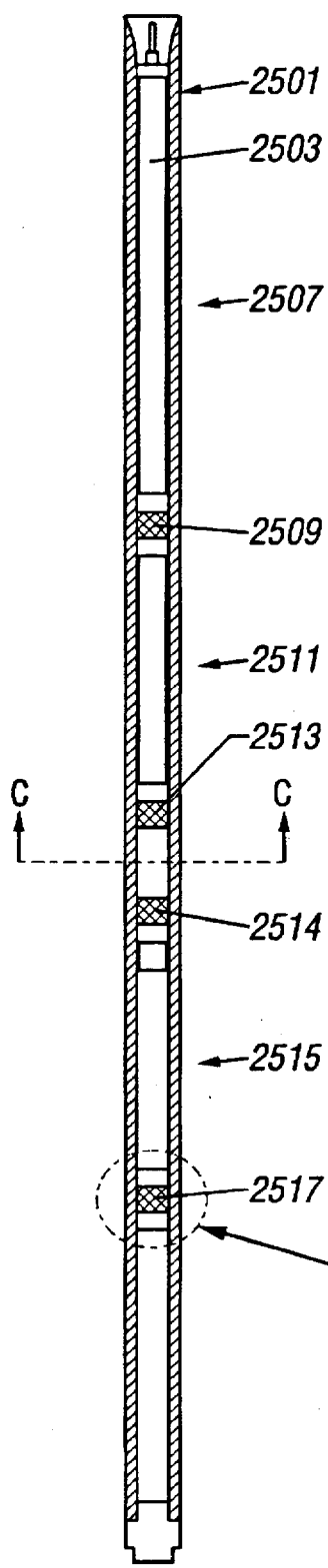
FIGS. 4A, 4B, 4C, and 4D depict another embodiment of a logging tool which utilizes the present invention.
Figure 4C:
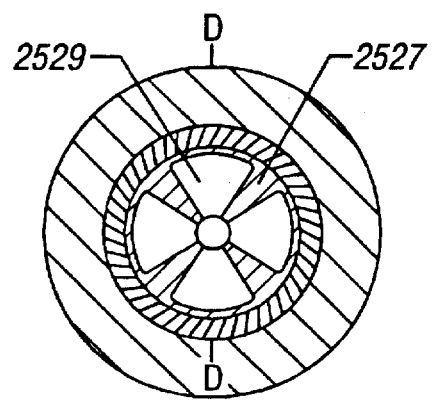
Figure 4B:
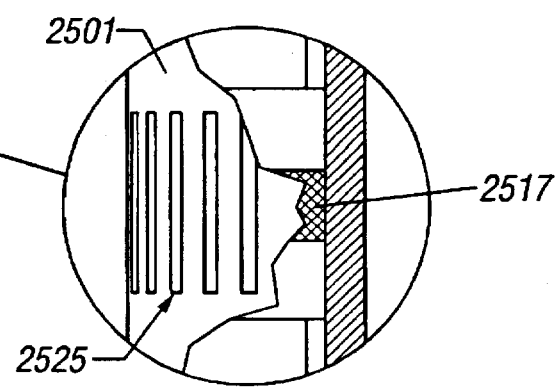

FIG. 4A depicts an alternative embodiment of the present invention which is especially useful in slim-hole applications. For purposes of this application, "slim hole" applications are these which utilize tubulars having an outer diameter of six (6) inches or less. Measurement sonde 2503 is shown disposed within central bore of measurement tubular 2501. Preferably, measurement tubular 2501 is formed of a reduced radial diameter in the range of 1½ to 2 inches. Measurement sonde 2503 is adapted to engage the central bore of measurement tubular 2501, in the areas of the antennas so that the antennas can be as large in diameter as possible and so that the antennas can serve a second purpose and locate the sonde 2503 within the bore of measurement tubular 2501. Measurement sonde 2503 includes a controller and transmitter electronics subassembly 2507, transmitter antenna 2509, receiver electronics subassembly 2511, receiver antennas 2513, 2514, transmitter electronics housing 2515, and transmitter antenna 2517. FIG. 4B is a detail fragmentary longitudinal section view of the region of transmitter 2517. Measurement tubular 2501 is shown in fragmentary section view. It is equipped with a plurality of axial slots 2525 which are filled with poorly-conducting or non-conducting epoxy or KEVLAR material. Transmitter 2517 is carried adjacent the axial slots 2525. A non-conducting or poorly conducting measurement tubular could be used instead of the slotted sonde. FIG. 4C is a cross-section view as seen along section lines C—C of FIG. 4A. As is shown, a plurality of alternating spokes 2527 and axial slots 2529 are provided. Drilling mud is pumped downward through axial slots 2529 in the region of the antennas. This arrangement has several significant advantages over the prior art. First, the measurement sonde 2503 may be mechanically supported by measurement tubular 2501 preventing movement of measurement sonde 2503. Second, the close alignment between measurement tubular 2501 and measurement sonde 2503 prevents the flow of drilling fluids in the region of the transmitting and receiving antennas, thus minimizing the possibility of damage to the antennas. Third, the transmitting and receiving antennas are placed as closely as possible to the axial slots in measurement tubular 2501 to increase measurement efficiency and reduce power requirements for the logging tool.

Figure 4D:
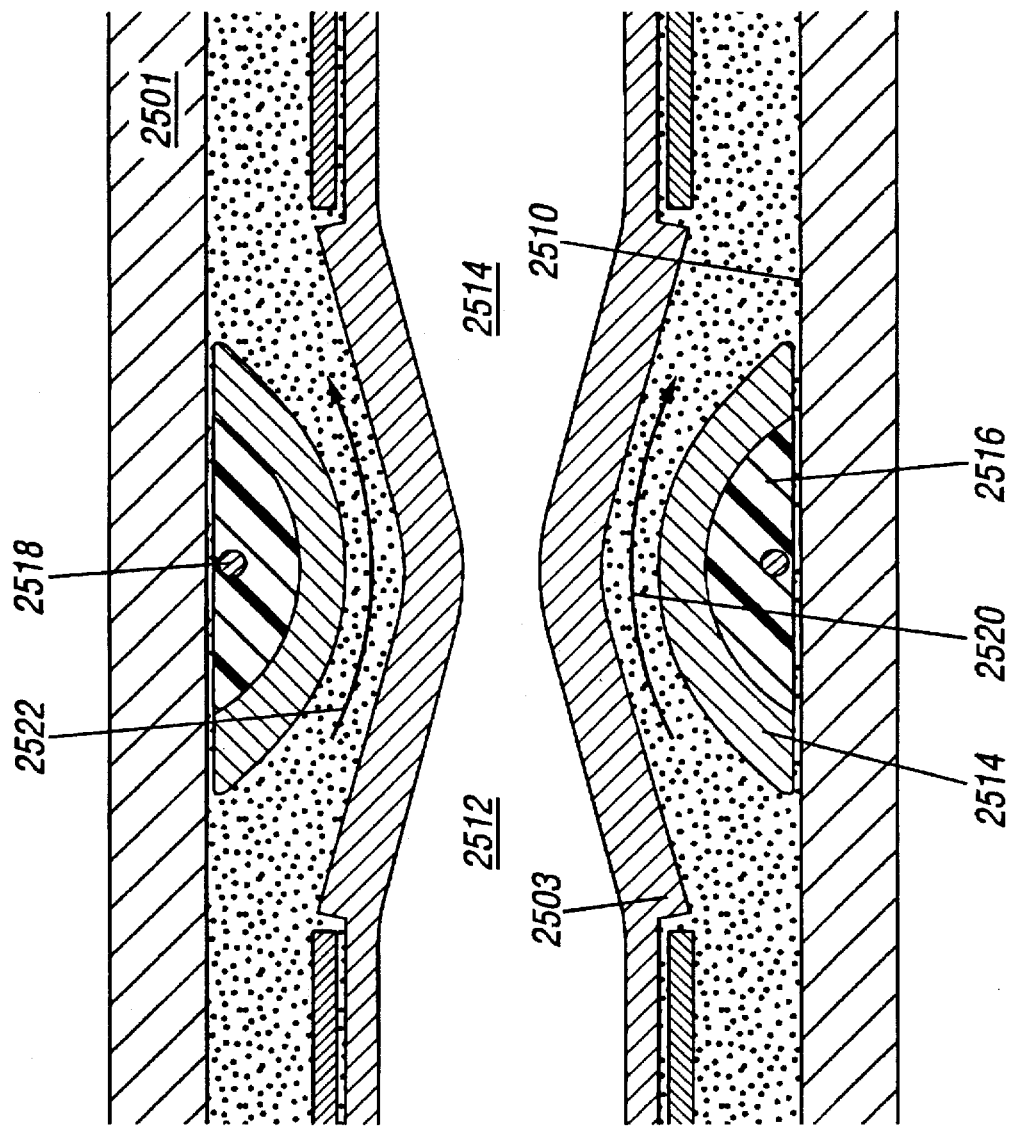

FIG. 4D is a longitudinal section view taken along section line D—D of FIG. 4C. As is shown, measurement sonde 2503 is disposed within central bore 2510 of measurement tubular 2501. Electronic cavities 2512, 2514 are provided for housing the logging tool electronics. Antenna section is provided with a C-shaped sleeve which is filled with fiberglass 2516, and which houses antenna wire 2518. Flowpaths 2520, 2522 are provided between C-shaped sleeve and the main body of measurement sonde 2503. Drilling mud is routed through flow passages 2520, 2522 in the region of antenna 2518. Antenna 2518 is placed as closely as possible to measurement tubular 2501, which may be formed from a poorly-conducting material, or which may include axial slots which allow for the inward and outward passage of electromagnetic fields.

5. Overview of Logging Operations

Figure 5B:
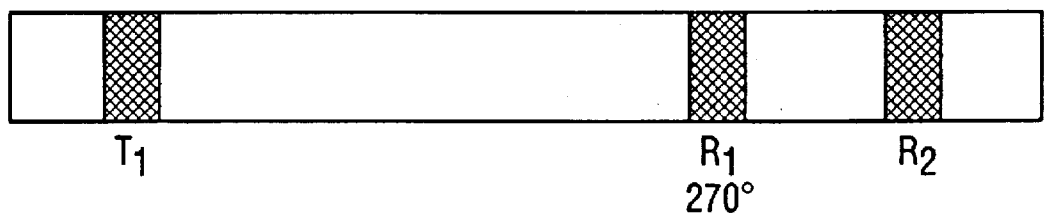
FIGS. 5BA and 5BB depicts the phase shift which is detected by the receiving antennas.

The operation of the logging tool which utilizes the present invention is depicted in schematic and graphical form in FIGS. 5A, 5B, 5C, 5D, and 5E. As is depicted in FIG. 5A transmitting antennas $T_1$, $T_2$ are spaced on both sides of a pair of receiving antennas $R_1$, $R_2$, allowing the measurement of both phase and amplitude. The transmitters and receivers are simple antennas consisting of a loop of wire imbedded in an insulating material, with tuning capacitors to trim the antenna response. The tool can be thought of as a pair of sensors, whose output is the average of two readings, reducing tool error from the temperature and pressure affects, tool misalignment, borehole washout and bed shoulder effects. In a vacuum, the velocity of electromagnetic radiation leads to a small phase shift between the two receivers $R_1$, $R_2$, while the increased distance to the far receiver causes the signal strength to be weaker at that point. In a more conductive formation, the radiation moves more slowly and attenuates more rapidly. As a result, either the difference in phase and/or the attenuation between the two receivers, or the ratio of amplitudes may be used to measure formation resistivity. The amplitude of a receiver signal is proportional to the field strength at the antennas and is measured in the units of volts. The attenuation between two receivers is defined as $20 \log {}^{V_1}/_{V_2}$ where $V_1$ is the amplitude of the output of receiver and $V_2$ is the output of Receiver 2. Attenuation is measured in dB (decibels). Attenuation is 20 log of the amplitude ratio. As is shown in FIGS. 5AA, 5AB and 5AC, two attenuation and phase readings are made, and then averaged. In these figures, the "X"s represent phase difference or attenuation. An upper transmitter reading $X_2$ is made utilizing upper transmitting antenna $T_2$ to propagate an electromagnetic wave outward and into the formation, and then back to be measured by the intermediate receiving antennas $R_1$, $R_2$. Then, the lower transmitter reading $X_1$ is made utilizing lower transmitting antenna $T_1$ to send an electromagnetic wave outward into the formation, and then back to be measured by intermediate receiving antennas $R_1$, $R_2$. The compensated reading is the arithmetic average of lower transmitter reading $X_1$ and upper transmitter reading $X_2$.

Figure 5C:
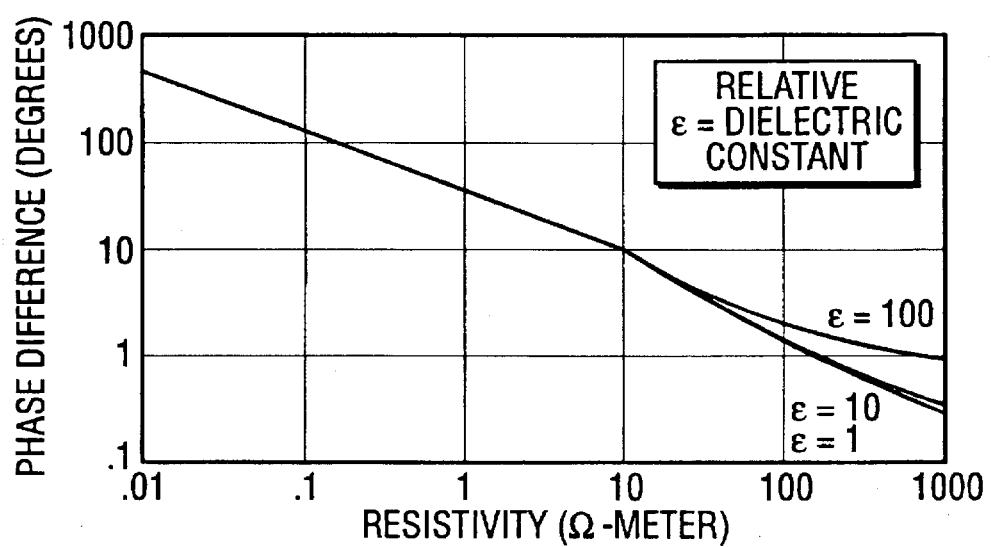
FIG. 5C is a graph which depicts the relationship between resistivity and the detected phase shift.

In the preferred embodiment, the primary measurement is phase resistivity which can be described with reference to FIGS. 5BA and 5BB. It is easy to see from this illustration that the greater the spacing between the two receiving antennas $R_1$, $R_2$, the larger the observed phase difference between the receiving antennas. The phase measurement is converted to resistivity, with only small effects from the dielectric constant, after averaging the values from both transmitters. FIG. 5C is a graph which plots resistivity in Ohm-meters to phase difference in units of degrees. A family of curves is shown for different relative dielectric constants (for the specific dielectric constant values of 1, 10, and 100).

Figure 5D:
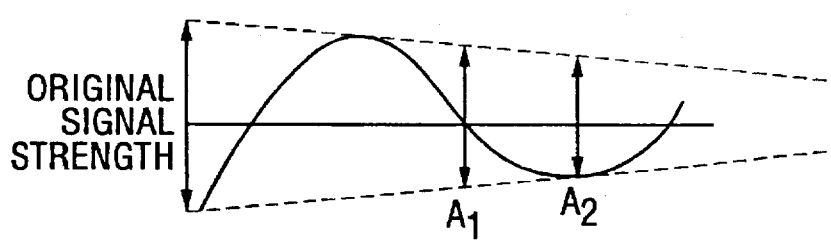
FIGS. 5DA and 5DB graphically depicts the amplitude attenuation of the interrogating signal.
Figure 5D:
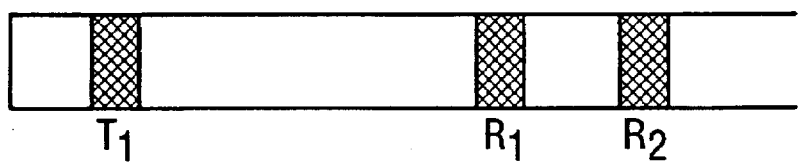
Figure 5E:
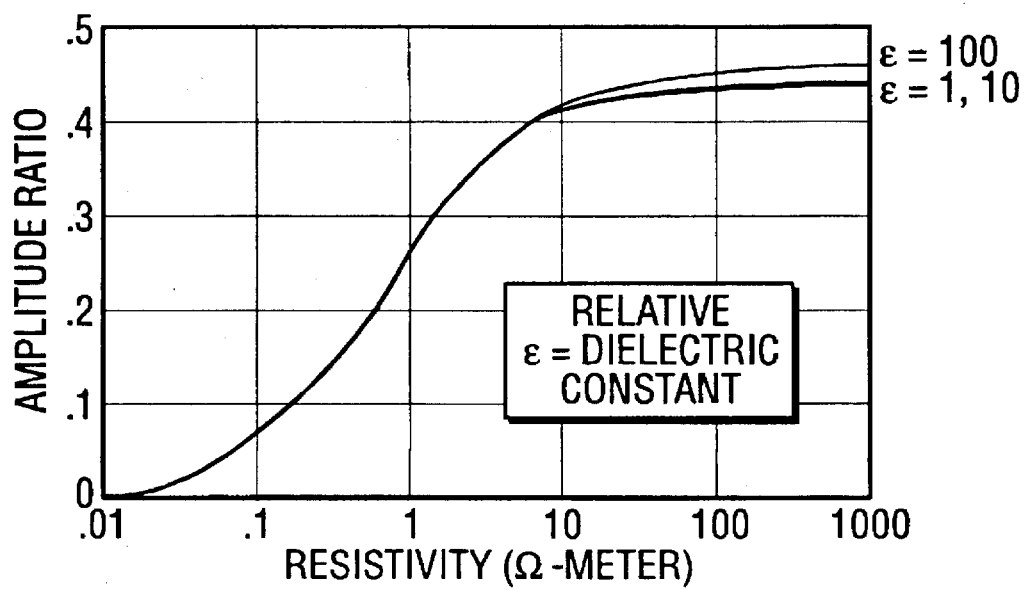
FIG. 5E depicts the graph of the relationship between resistivity and the amplitude ratio.

FIGS. 5DA and 5DB depicts the amplitude attenuation which occurs as the electromagnetic wave propagates through the formation. A two megahertz wave, under downhole conditions, propagates only a few feet before the signal strength fades away, so the rate of attenuation or amplitude ratio of the signal is also measured. FIGS. 5DA and 5DB graphically depicts the attenuation of the signal from its original signal strength as it passes through the surrounding formation. Measurements made at receiving antennas $R_1$, $R_2$ can be used to develop an amplitude ratio which is representative of the amount of attenuation that the interrogating signal experiences as it travels between receiving antenna $R_1$ and receiving antenna $R_2$. In the preferred embodiment of the present invention, the tool utilizes a microprocessor with memory to store values of the amplitude for each transmitter into memory, and then computes the attenuation for each transmitter, averaging the values for each transmitter to produce a compensated attenuation. The attenuation or equivalently amplitude ratio is then transformed to resistivity. FIG. 5E is a graph which plots the relationship of resistivity in units of Ohm-meters to the amplitude ratio, for a plurality of differing relative dielectric constants (and specifically for the relative dielectric constant values of 1, 10, and 100).

The following discussion illustrates how the dual transmitter, dual receiver measurement-while-drilling apparatus of the present invention is utilized to derive an accurate measure of the amplitude attenuation and phase shift of the interrogating electromagnetic signal which travels through the borehole and surrounding formation.

First, consider four transmitter-to-receiver signals:

(Transmitter 1 [X1] to Receiver 1 [R1]): $A_{11}e^{i\phi 11}$ (Transmitter 1 [X1] to Receiver 2 [R2]): $A_{12}e^{i\phi 12}$ (Transmitter 2 [X2] to Receiver 1 [R1]): $A_{21}e^{i\phi 21}$ (Transmitter 2 [X2] to Receiver 2 [R2]): $A_{22}e^{i\phi 22}$ The measured amplitudes are made up of:

$$A_{mn} = X_m R_n a_{mn} \quad \text{(Eq. 1.1)}$$

where $X_m$ = transmitter output variation $R_n$ = receiver sensitivity variation $a_{mn}$ = true amplitude (transmitter M to receiver N);

and the measured phases are made up of:

$$\phi_{mn} = \phi_{Xm} + \phi_{Rn} + \phi_{mn} \quad \text{(Eq. 1.2)}$$

where $\phi_{Xm}$ = transmitter phase (output) variation $\phi_{Rn}$ = receiver phase variation $\phi_{mn}$ = true phase (transmitter M to receiver N) The foregoing general equations correspond to the following more specific equations:

$A_{11} = X_1 R_1 a_{11}$ $A_{12} = X_1 R_2 a_{12}$ $A_{21} = X_2 R_1 a_{21}$ $A_{22} = X_2 R_2 a_{22}$ $\phi_{11} = \phi_{X1} + \phi_{R1} + \phi_{r11}$ $\phi_{12} = \phi_{X1} + \phi_{R2} + \phi_{r12}$ $\phi_{21} = \phi_{X2} + \phi_{R1} + \phi_{r21}$ $\phi_{22} = \phi_{X2} + \phi_{R2} + \phi_{r22}$ Taking ratios of the various transmitter-to-receiver signals produces the following:

For Transmitter 1:

$$\frac{A_{12} e^{i\phi 12}}{A_{11} e^{i\phi 11}} = \frac{A^{12}}{A^{11}} e^{i(\phi 12 - \phi 11)}$$

and for Transmitter 2:

$$\frac{A_{21} e^{i\phi 21}}{A_{22} e^{i\phi 22}} = \frac{A^{21}}{A^{22}} * e^{i(\phi 21 - \phi 22)}$$

Multiplying these and taking the square root gives:

$$\sqrt{\frac{A_{12}}{A_{11}} * e^{i(\phi 12 - \phi 11)} * \frac{A_{21}}{A_{22}} * e^{i(\phi 21 - \phi 22)}} \quad \text{(Eq. 1.3)}$$

$$\sqrt{\frac{A_{12} * A_{21}}{A_{11} * A_{22}}} \; e^{i1/2(\phi 12 + \phi 21 - \phi 11 - \phi 22)}$$

Straightforward algebraic manipulation of Eqs. 1.1 through 1.3 yields:

$$\sqrt{\frac{a_{r12} * a_{r21}}{a_{r11} * a_{r22}}} * e^{i1/2(\phi r12 + \phi r21 - \phi r11 - \phi r22)}$$

because all the system variables drop out of the measurement.

Therefore, by using two transmitters and two receivers, systematic variables can be removed from both the attenuation (amplitude) and from the phase velocity (phase difference) terms.

Within the context of the preferred embodiment of this invention, in which a sampled-data processing means produces a signal as a function of formation resistivity based on phase-representing signals, the following analysis demonstrates certain matter relevant to the stability feature.

Consider two consecutive samples: Sample A and Sample B.

During Sample A, a first transmitting coil is energized to cause a wave to propagate through the formation in a direction such that the wave passes a first receiving coil (R1), and later passes a second receiving coil (R2), and induces each receiver coil to produce a signal.

During Sample B, a second transmitting coil is energized to cause a wave to propagate through the formation in a direction such that the wave passes a second receiving coil (R2), and later passes the first receiving coil (R1), and induces each receiver coil to produce a signal.

Let $\phi$MR2A represent the measured phase of the signal produced by receiver coil R2 during Sample A; let $\phi$MR1A represent the measured phase of the signal produced by receiver coil R1 during Sample A; let $\phi$MR1B represent the measured phase of the signal produced by receiver coil R1 during Sample B; and let $\phi$MR2B represent the measured phase of the signal produced by receiver coil R2 during Sample B.

The φMR2A signal depends on the phase of the wave at the location of R2, and in general, has an error component attributable to various phase shifts including those introduced by the tuned receiver coil, cabling from the receiver coil to the receiver, and the receiver itself. Let φTR2A represent the true phase of the wave at the location or R2 during Sample A, and let φR2E represent the error component so introduced.

$$\phi MR2A = \phi TR2A + \phi R2E \qquad \text{Eq. 2.1}$$

Similarly, the φMR1A signal depends on the phase of the wave at the location or R1, and in general, has its own error component. Let φTR1A represent the true phase of the wave at the location of R1 during Sample A, and let φR1E represent the error component so introduced.

$$\phi MR1A = \phi TR1A + \phi R1E \qquad \text{Eq. 2.2}$$

During Sample A, the φMR1A signal and the φMR2A are simultaneously processed to produce a DeltaA signal that represents the difference in phase between these two signals (i.e., φMR1a−φMR2A).

$$DeltaA = (\phi TR2A - \phi TR1A) + (\phi R2E - \phi R1E) \qquad \text{Eq. 2.3}$$

The component of the DeltaA signal representing the true phase difference (φTR2A−φTR1A) is a function of the resistivity of the formation in the region between the two receiver coils. Let F(rho) represent this component.

$$DeltaA = F(rho) + (\phi R2E - \phi R1E) \qquad \text{Eq. 2.4}$$

Similarly, during Sample B, the φMR2B signal and the φMR1B are simultaneously processed to produce a DeltaB signal that represents the difference in phase between these two signals (i.e., φMR2B−φMR1B).

$$\phi MR1B = \phi TR1B + \phi R1E \qquad \text{Eq. 2.5}$$

$$\phi MR2B = \phi TR2B + \phi R2E \qquad \text{Eq. 2.6}$$

$$DeltaB = (\phi TR1B - \phi TR2B) + (\phi R1E - \phi R2E) \qquad \text{Eq. 2.7}$$

The component of the DeltaB signal representing the true phase difference (φTR1B−φTR2B) is a function of the resistivity of the formation in the region between the two receiver coils; i.e., it equals f(rho).

$$DeltaB = f(rho) + (\phi R1E - \phi R2E) \qquad \text{Eq. 2:8}$$

The Delta A signal is recorded so that it can be retrieved and processed with the Delta B signal.

By adding Equations 2.7 and 2.8, it follows that:

$$DeltaA + DeltaB = 2 * f(rho) + \phi R2E - \phi R1E - \phi R2E + \phi R1E$$

and $$f(rho) = \tfrac{1}{2} * (DeltaA + DeltaB) \qquad \text{Eq. 2.9}$$

In other words, a computed signal representing the sum of the consecutive samples is a function of formation resistivity, and error components such as φR1E and φR2E do not introduce errors into this computed signal.

6. The Operation of Prior Art Logging Tools

Figure 6A:
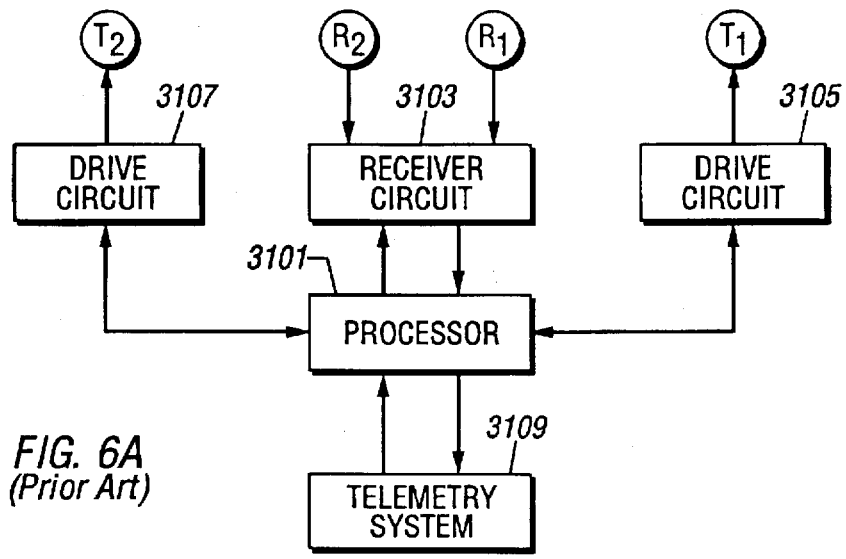
FIG. 6A is a block diagram view of the transmission and reception systems of the logging-while-drilling apparatus of the present invention.

FIGS. 6A, 6B, 6C, 6D, 6E, 6F, and 6G depict the prior art electronics carried by one type of logging tool in block diagram and electric schematic form. As is shown in FIG. 6A, processor 3101 directs the operation of drive circuits 3105, 3107 and receiver circuit 3103. Drive circuit 3107 operates to energize selectively transmitting antenna $T_2$, while drive circuit 3105 operates to energize selectively transmitting antenna $T_1$. Receiver circuit 3103 receives the measurements of the electromagnetic field made by receiving antennas $R_1$, $R_2$. Processor 3101 supplies data to telemetry system 3109, and receives instructions from telemetry system 3109. Telemetry system provides the electrical commands to a mud pulse telemetry actuator which is in communication with a fluid column in the wellbore, and which is utilized to impress a coded message in the fluid column.

The principle components of the electronics carried by the logging tool, which are depicted in block diagram form in FIG. 6A, are depicted in detail in FIGS. 6B, 6C, 6D, 6E, 6F, and 6G.

Figure 6B:
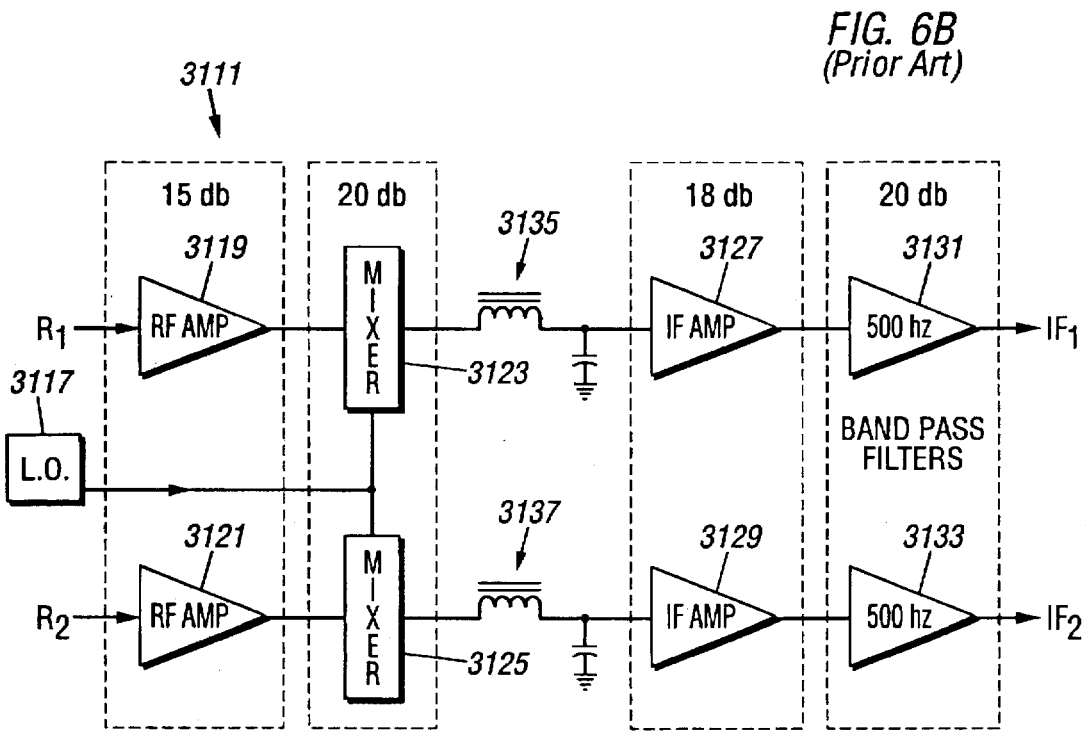
FIGS. 6B, 6C, 6D, 6E, and 6F are electrical schematics of a prior art receiver circuit.

First in broad overview with reference to FIG. 6B, there is depicted dual receiver 3111 in simplified electrical schematic form. In broad overview, the signals from receiving antennas $R_1$, $R_2$ are fed to dual receiver 3111. The signals are amplified at RF amplifiers 3119, 3121 and heterodyned with the output of the 1.995 megahertz local oscillator 3117, which provides a resultant 5 kilohertz intermediate frequency (IF). The intermediate frequency will retain the phase relationship of the two receiver signals by using a common oscillator for mixers 3123, 3125. The signals are passed to intermediate frequency (IF) amplifiers 3127, 3129 for further amplification. The signals are then passed through 500 hertz band pass filters 3131, 3133 before being fed to the amplitude/phase detector 3113 of FIGS. 6C and 6D.

Now more particularly, the dual receiver 3111 of FIG. 6B receives the 2 megahertz signal from receiving antennas $R_1$, $R_2$, which are coupled to the input of RF amplifiers 3119, 3121. The coupling components are specifically selected to minimize phase shift with temperature. The RF amplifiers 3119, 3121 have a gain of 15 db and the outputs are coupled to the balanced mixers 3123, 3125. The output of the local oscillator is injected to the mixer via a power splitter arrangement to provide equal amplitudes with zero degrees of phase shift to each mixer. The splitter, combined with a 6 db attenuator, will ensure the proper level and also minimize cross talk between the two mixers. A balanced mixer is used to minimize local oscillator feed-through to the output. The mixer stage has a gain of 20 db. The mixer outputs are fed through five kilohertz low pass filters 3135, 3137 and coupled to the non-inverting input of IF amplifiers 3127, 3129, which provides an 18 db gain. The output of IF amplifier 3127, 3129 is fed through 500 hertz band pass filter op amps 3131, 3133 which provide a 20 db gain. This final amplification has a very high Q 500 hertz band pass filter. The passive components of the filter must be matched to ensure minimal phase shift with frequency and temperature. It is important that both filters remain matched.

Figure 6C:
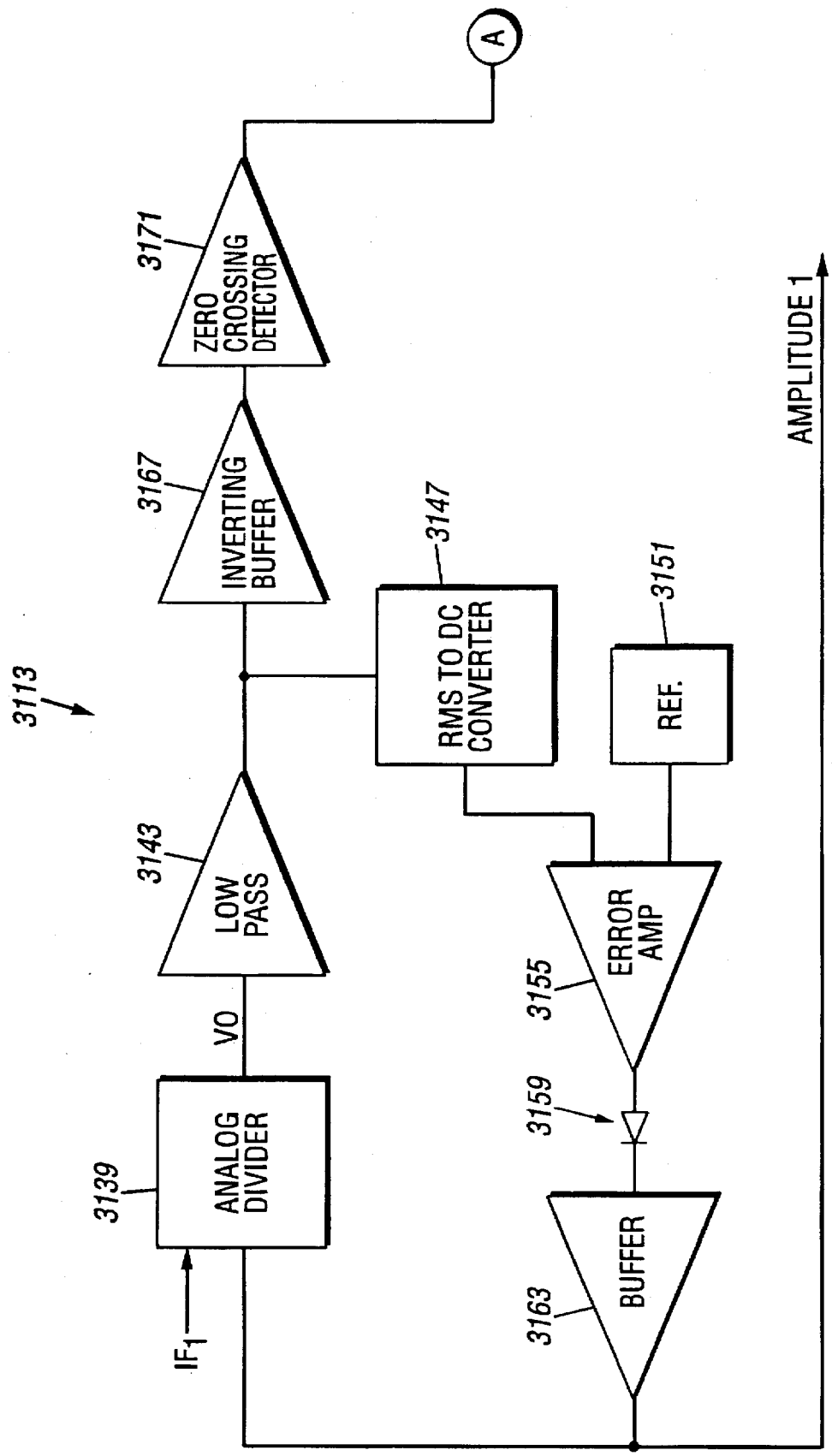
Figure 6D:
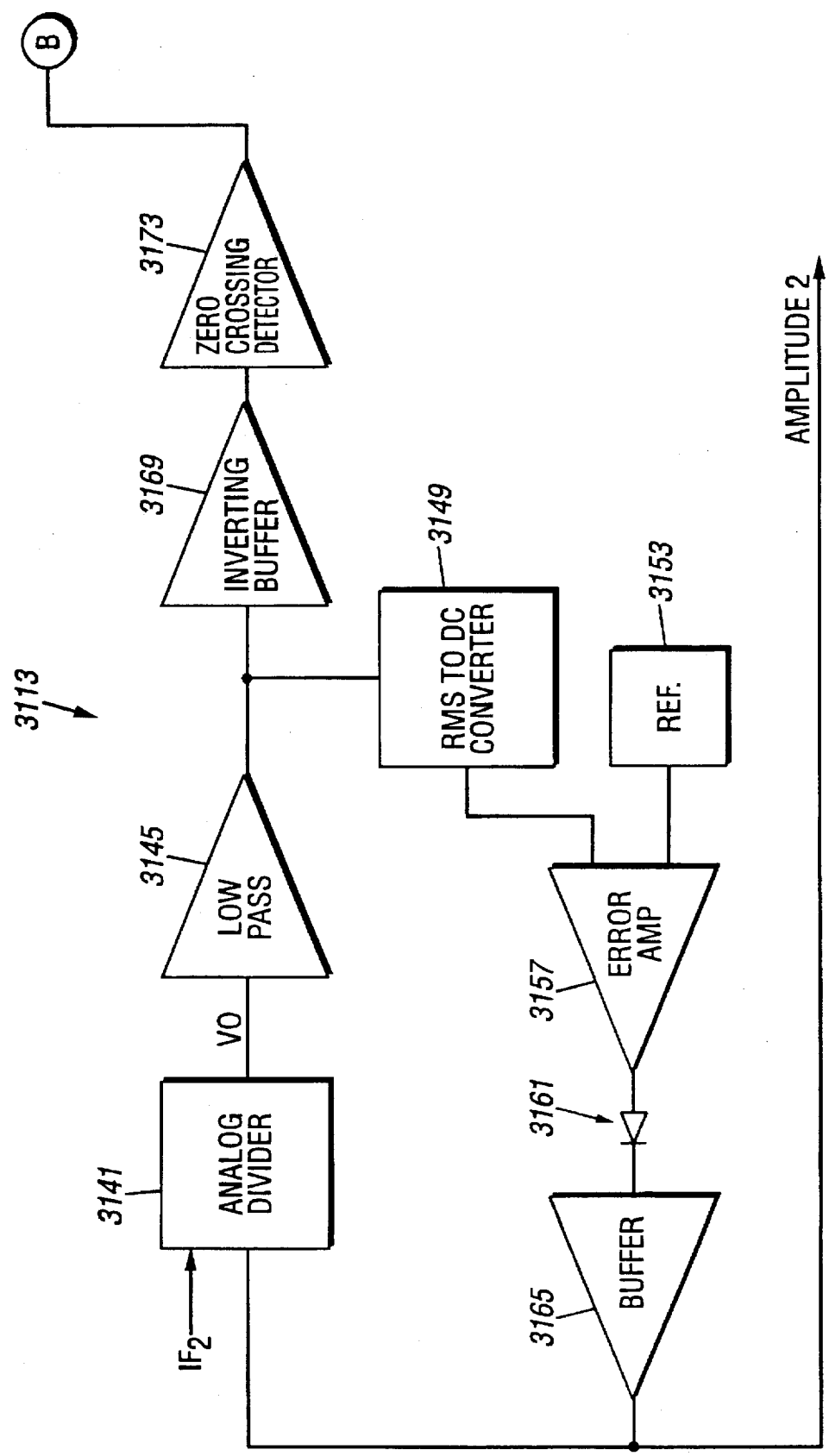
Figure 6E:
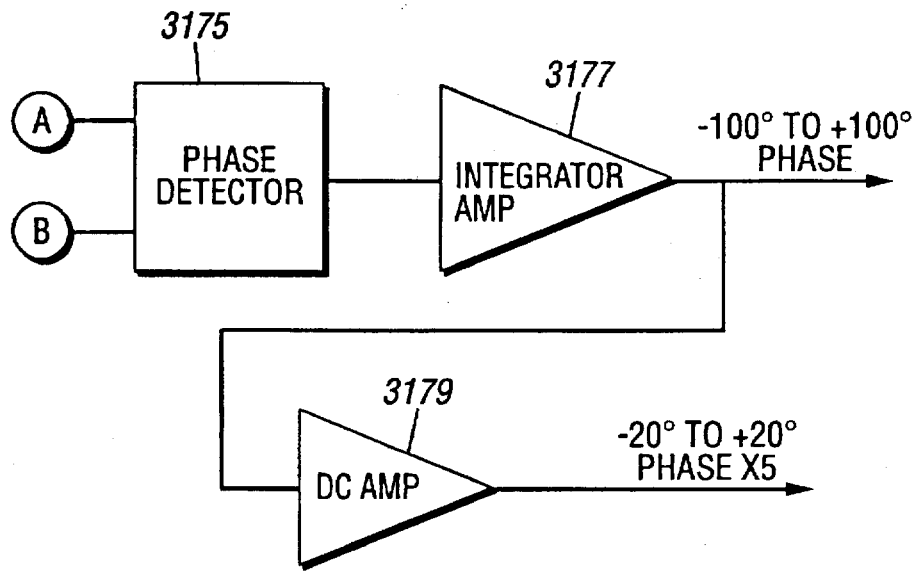

The amplitude/phase detector 3113 is depicted in FIGS. 6C, 6D, and 6E. In broad overview, the amplitude/phase detector 3113 has a separate automatic gain (AGC) circuit for each IF signal received, which provides constant amplitudes for the phase detector. The control voltage of the AGC is proportional to the amplitude of the IF signal providing a DC signal corresponding to the received signal level. The DC level is used by the processor as the amplitude of the received signal level. The output of the phase detector is a pulse which is proportional to the phase shift between the two IF signals. This voltage is integrated and amplified to provide phase outputs of 100° and 20° full scale readings. The resultant signal is fed to the microprocessor board which initiates a measurement cycle, times the events during that cycle, samples data from the receiver, stores data in memory, and communicates with a tool bus.

The automatic gain control circuit has a dual purpose: to detect the amplitude of the incoming signal from the dual receiver 3111 of FIG. 6B, and to maintain a constant amplitude signal to the phase detector. The automatic gain control contains for each channel an Analog Devices linear divider 3139, 3141. The output of the linear dividers 139, 141 ($V_o$) is equal to the intermediate frequency IF divided by a DC level ($V_z$). The output of each analog divider 3139, 3141 is connected to low pass filter 3143, 3145, with a cut off of 7.5 kilohertz to remove any high frequency noise. This signal is fed to an RMS-to-DC converter 3147, 3149. Error amplifiers 3155, 3157 compare the output of converters 3147, 3149 to reference signals provided by reference signal generators 3151, 3153, and generates a control voltage dependent upon the difference. To prevent a loop lock-up, negative values resulting from the loss of signal are diode-blocked by diodes 3159, 3161 which are coupled between error amplifiers 3155, 3157 and output buffers 3163, 3165. The control voltage is fed to the automatic gain control to maintain a constant output, and to the processor for amplitude information. The IF signals from the automatic gain control circuit are capacitively coupled to inverting buffers 3167, 3169 for phase detection, to eliminate any DC offset. Preferably, the $IF_2$ signal is inverted 180°. This allows the output of the phase detector to be in the range of −180° to +180°, instead of being in the range of 0° to 360°. The signals are then squared-up with zero crossing detectors 3171, 3173, and passed to a 4013 dual flip-flop set which function as phase detector 3175. To accomplish this, the supply voltage to the flip-flop is not grounded. Instead, a positive voltage is powered from a floating supply so that what would normally be considered a low voltage (ground) will be a negative voltage or −180°. Likewise, a high level will be a positive voltage, or +180°. The clock inputs are used so that the phase detector will not be sensitive to cycle variation in the IF square waves. The phase detector output will be as follows:

(1) a square wave input from receiver $R_1$ intermediate frequency $IF_1$ sets pin 1 high;

(2) a square wave input from receiver R2 intermediate frequency IF sets pin 13 high;

(3) a high on pin 13 resets both flip-flops sending pin 1 low.

If the receive signals are in phase, the signals to the flip-flop would have 180° of phase difference due to the inversion of $IF_2$. This would result in the phase detector having a 50% duty cycle on pin 1, switching between negative 4.5 volts and positive 4.5 volts. This would result in zero volts on the low pass filter of integrator amplifier 3177. As the phase differential increases, so does the positive pulse width, causing a negative voltage out. Likewise, a negative phase input causes a negative pulse width resulting in a negative DC level from the filter. The gain in the low pass filter is set so that 100° equals 5 volts. This signal is used by the processor for the plus or minus 100° input and is also amplified five times by DC amplifier 3179, for the 20° of phase difference to equal a 5 volt output.

Figure 6F:
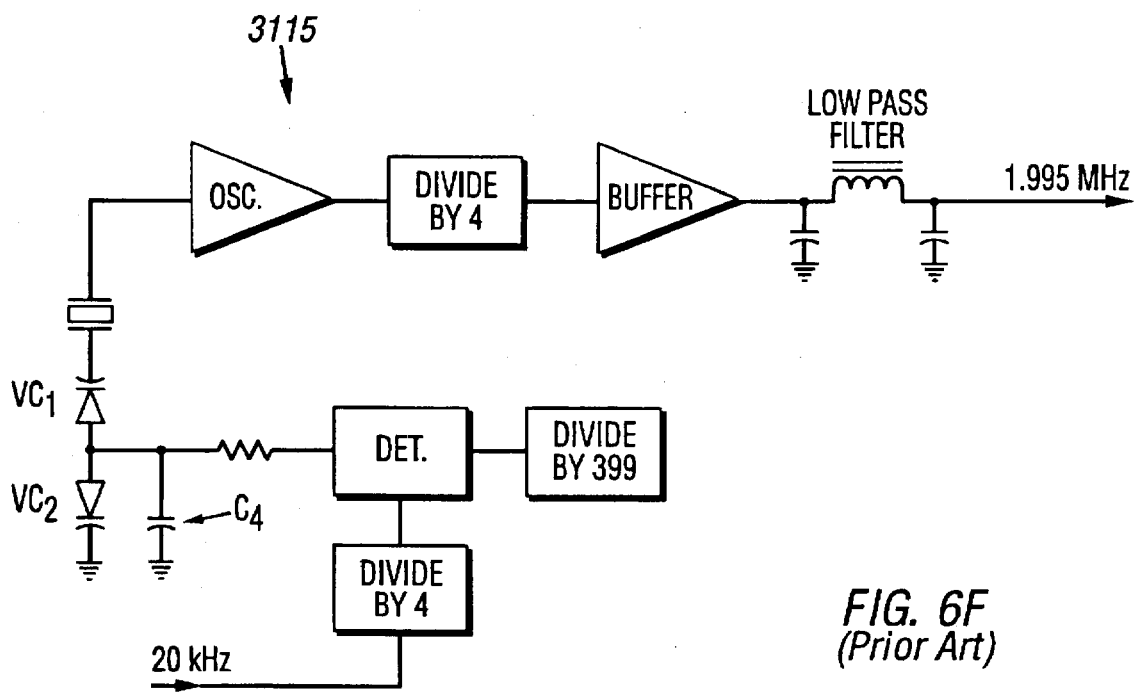

FIG. 6F depicts a local oscillator 3115 which generates the 1.995 megahertz injection for the receiver mixers of FIG. 6B. Local oscillator 3115 consists of a voltage controlled oscillator, a phase lock loop, and a final amplifier. A 20 kilohertz reference is supplied for the phase lock loop. A voltage controlled crystal (Colpitts) oscillator is utilized to reduce frequency error due to vibration downhole. The voltage controlled oscillator is looked to a reference frequency so the IF will be 5 kilohertz. A higher frequency crystal (7.982 megahertz) is used to increase the tuning range of the circuit. The oscillator is tuned to the desired center frequency by variable capacitance diodes VC1 and VC2. Control voltage for the diodes is supplied by the phase look loop as follows. The output of the oscillator is divided by 4 to obtained the desired 1.995 megahertz frequency which is coupled to pin 9 of an MC14569 programmable binary down counter. To achieve a division ratio of 399, the MC14569 is cascaded with the programmable counter in the MC14568. The remaining counter in the MC14568 is used to divide the 20 kilohertz reference by 4 to provide a 5 kilohertz reference for the phase detector. The 5 kilohertz out of the divider (1.995/399) is compared to the 5 kilohertz reference by the MC14568 phase detector. Pulses out of the phase detector on pin 13 represent the frequency error between the divided 1.995 megahertz and the 5 kilohertz reference. These pulses are integrated by capacitor C4 to provide a correction voltage for diodes VC1 and VC2 to bring the oscillator back on frequency. The 1.995 megahertz is buffered by three 4049 inverters which are tied in parallel. A Pi network is used to match the output of the 4049's to 90 Ohms and also attenuate the harmonics of the 1.995 megahertz square wave. The power output of the local oscillator is approximately 10 milliwatts or +10 dbm.

Figure 6G:
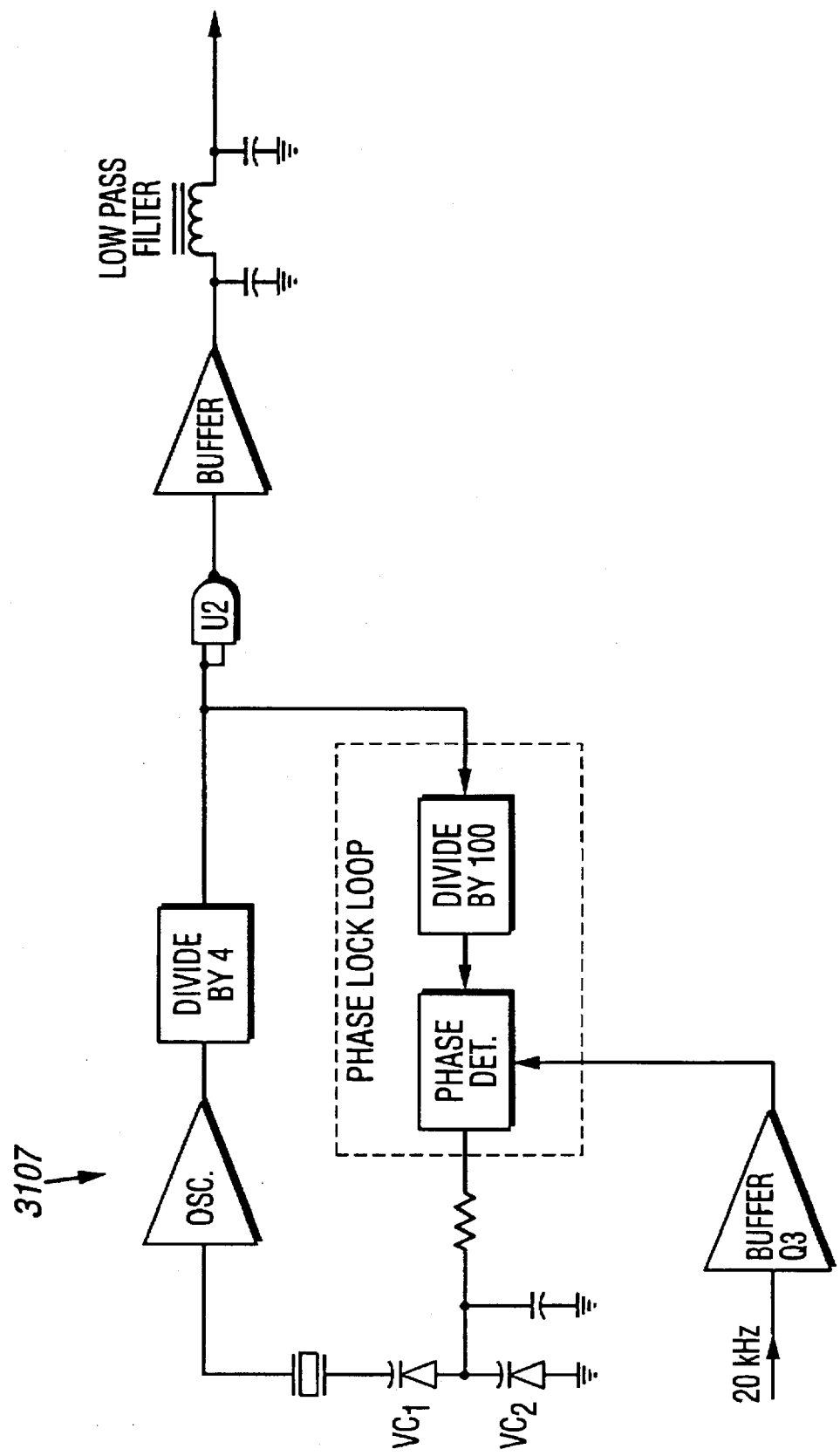
FIG. 6G is an electrical schematic depiction of a prior art drive circuit for use in transmission.

FIG. 6G depicts drive circuit 3107 of FIG. 6A, which is identical to drive circuit 3105 of FIG. 6A. Each drive circuit is identical, except that each has a different transmit control voltage. Each transmitter drive circuit consists of a voltage controlled crystal oscillator, a phase look loop, a final amplifier, and a transmitter on/off control. The 20 kilohertz reference is provided. To ensure a satisfactory lock range, a 8 megahertz voltage controlled crystal oscillator is used in the transmitters. The frequency is adjusted by the variable capacitants of VC1 and VC2. The output is divided by 4 to obtain the desired 2 megahertz final frequency. The two megahertz output signal is coupled to the phase look loop, which in turn divides the 2 megahertz signal by 100 to obtain the 20 kilohertz reference frequency to compare with the 20 kilohertz from the phase detector. Pulses from the phase detector represent the frequency error. A correction voltage is supplied to VC1 and VC2 to bring the oscillator back on frequency. The 2 megahertz signal is also tied to U2 which controls the output of the transmitter. The output stage is driven into class D operation by using a square wave input which results in higher amplifier efficiency. A low pass filter is used to reduce the harmonics. The cut off for this filter is 3 megahertz. The power output of the transmitter is approximately 0.5 watts (27 dbm).

7. Disadvantages with the Prior Art Logging Tools

It is apparent from an examination of FIGS. 6A through 6G that a large number of analog and digital circuit components must cooperate with a high degree of precision and reliability in order to correctly measure amplitude attenuation and phase shift of the interrogating electromagnetic fields. The probability of system failure is the product of the probability of failure of the individual analog and digital components. A greater number of analog and digital circuit components necessarily means that there is a higher probability of system failure. The same holds true for calibration errors and temperature sensitivity of the circuit components. Aside from these problems, the electronic housing necessary for such a large number of components results in a relatively wide and long subassembly. Finally, the power requirements for such a large number of analog and digital circuit components is not insignificant.

8. Transmission and Reception Systems

Figure 7A:
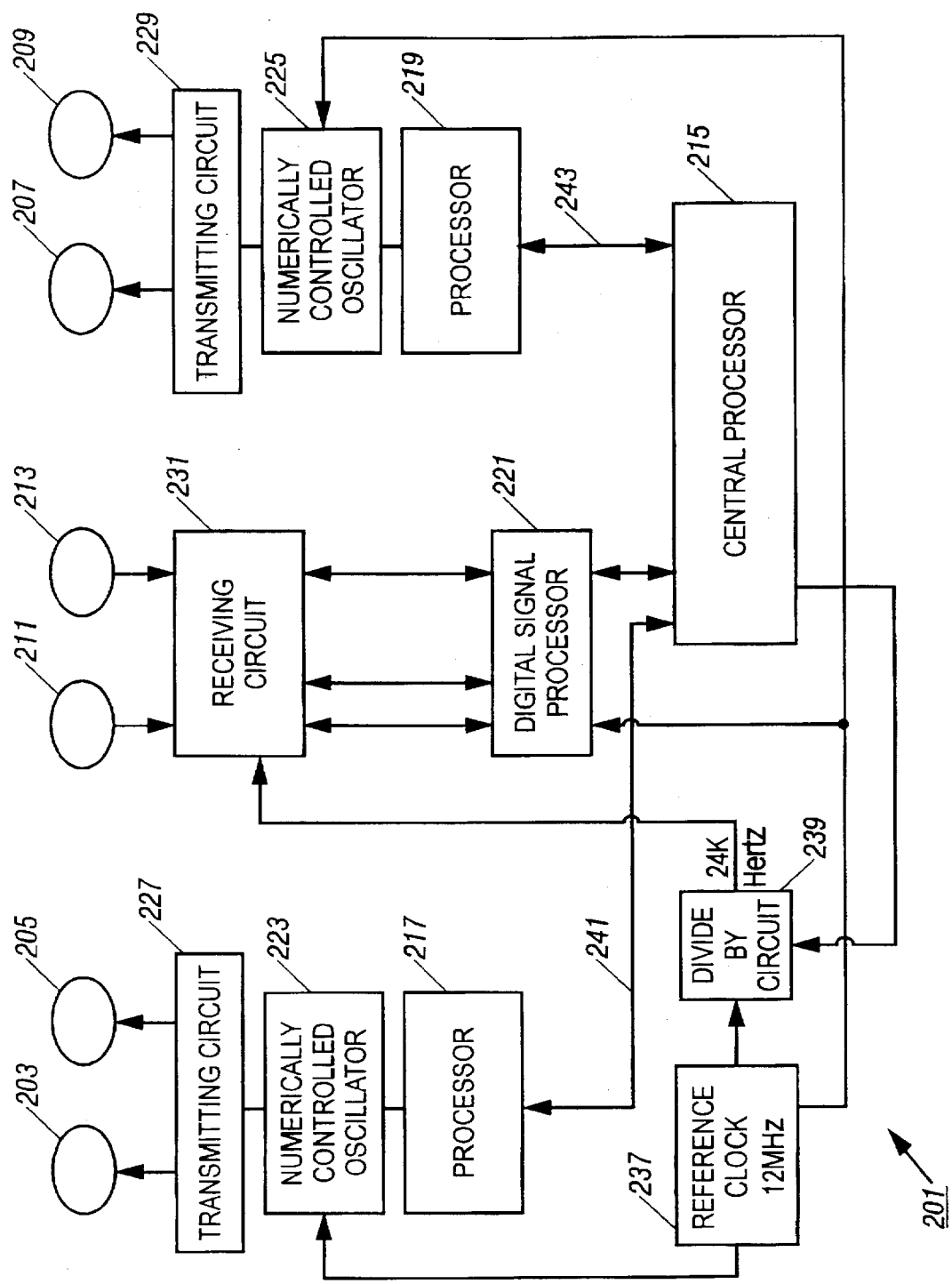
FIG. 7A provides a block diagram of an exemplary logging tool constructed in accordance with the present invention.

FIG. 7A provides a block diagram view of an exemplary logging tool 201 constructed in accordance with the present invention. Logging tool 201 includes upper transmitters 203, 205, lower transmitters 207, 209, and intermediate series resonant receiving antennas 211, 213. Central processor 215 is preferably a microprocessor device which is utilized to coordinate the operation of the components of logging tool 201, to record and process the data obtained from measurements made by intermediate series resonant receiving antennas 211, 213, and to interact with the mud pulse telemetry data transmission system carried in the adjoining drill collar member. Processor 217 is provided and dedicated for the control of numerically controlled oscillator 223. Processor 219 is provided and dedicated for the control of numerically controlled oscillator 225. Central processor 215 communicates with processors 217, 219 via data buses 241, 243 respectively. Numerically controlled oscillators 223, 225 are adapted to receive a binary command signal as an input, and to produce an analog output having particular frequency, phase, and amplitude attributes. The frequency, phase, and amplitude attributes are determined at least in part by the command signals applied from processor 217, 219 to the input of numerically controlled oscillators 223, 225, and the data contained in various registers within numerically controlled oscillators 223, 225. Numerically controlled oscillators 223, 225 provide the analog signal to transmitting circuits 227, 229 respectively. The components which make up transmitting circuits 227, 229 will be described in greater detail below.

Receiving antennas 211, 213, communicate through receiving circuit 231 with the first and second data input channels of a digital signal processor 221. The digital signal processor 221 receives data at the first and second inputs after it is converted from analog form to digital form by analog-to-digital converters contained within receiving circuit, and records the data elements in a circular memory buffer. Central processor 215 pulls data from the buffers in a prescribed and predetermined manner in order to sample the current which is generated in receiving antennas 211, 213 in response to the propagation of electromagnetic signal through the adjoining formation. As is conventional, the resistivity of the formation surrounding the logging tool 201 may be determined by either (1) determining the amplitude attenuation of an electromagnetic wave propagating through the formation adjoining receiving antenna 211 and receiving antenna 213, or (2) by determining the phase shift between the electromagnetic signal propagating through the formation adjoining receiving antenna 211 and 213, or from both. These measurements comprise a relative measurement of the amplitude attenuation and a relative measure of the phase shift.

The present invention also allows other techniques for quantifying the electromagnetic field which propagates through the formation surrounding logging tool 201. Since precise control can be obtained with the present invention over the frequency, phase, and amplitude of the electromagnetic wave generated by transmitting antennas 203, 205, 207, and 209, the present invention allows the measurement of the absolute amplitude attenuation of electromagnetic signal between any particular transmitting antenna 203, 205, 207, and 209 and any particular receiving antenna 211, 213. Furthermore, the logging tool 201 of the present invention allows for the absolute measurement of the phase shift of an electromagnetic signal between any particular transmitting antenna 203, 205, 207, 209 and any particular receiving antenna 211, 213. Prior art devices do not allow such optional techniques for determining amplitude attenuation and phase shift, since prior art devices are unable to determine easily and precisely the frequency, phase, and amplitude of a signal generated at any particular transmitting antenna.

The operation of numerically controlled oscillators 223, 225 is clocked by the output of reference clock 237, which is preferably 12 megaHertz. The operation of receiving circuit 231 is controlled by central processor 215 through digital signal processor 221. Receiving circuit 231 is clocked by the output of divide-by circuit 239, and thus samples the output of receiving circuit 231 at a particular frequency which is much less than that utilized to energize transmitter antennas 203, 205, 207 and 209.

Figure 7B:
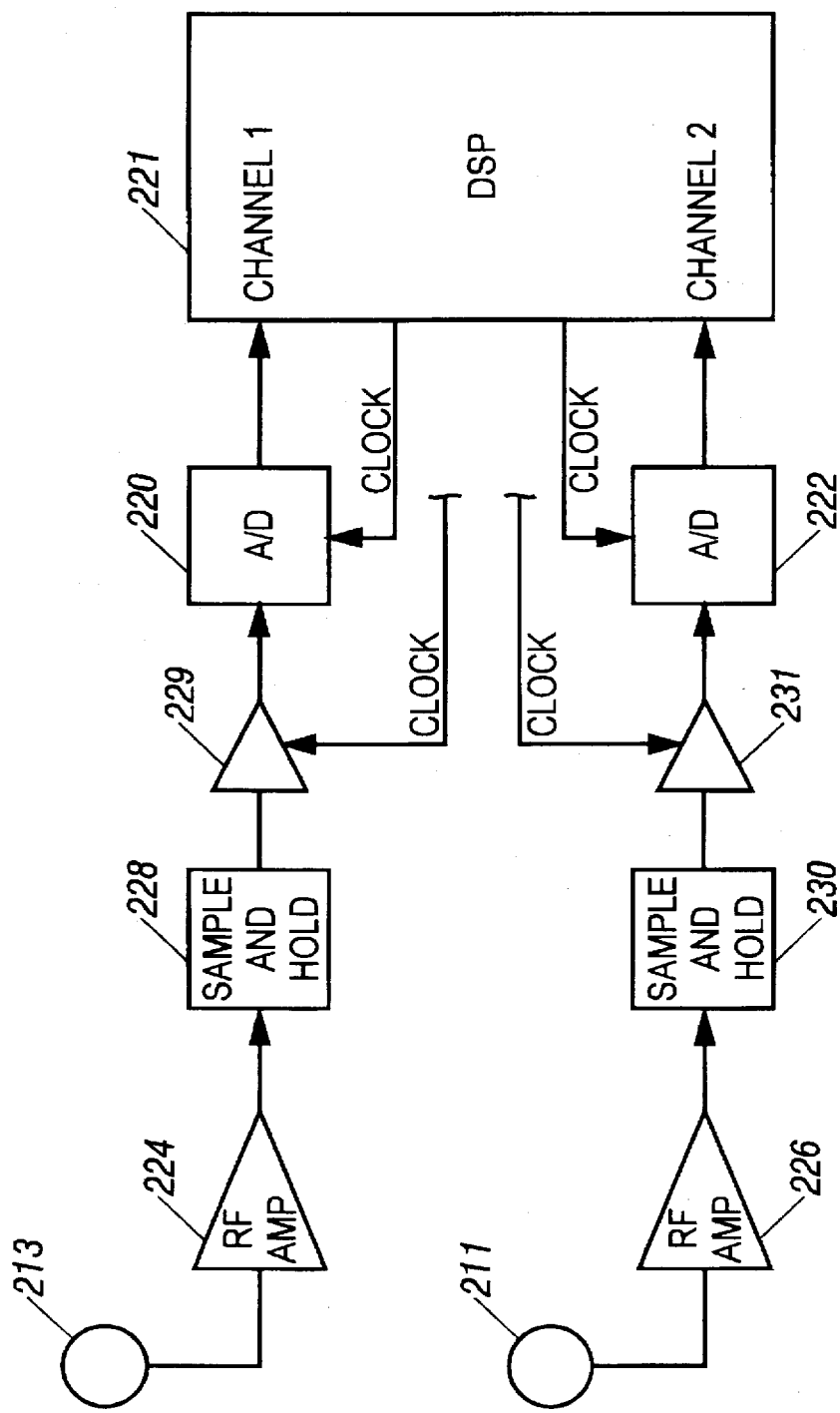
FIG. 7B is a block diagram depiction of the receiving circuit of FIG. 7A.

FIG. 7B is a block diagram depiction of the circuit components of receiving circuit 231 of FIG. 7A. As is shown, the current developed in receiving antenna 213 is directed to radio frequency amplifier 224 to boost the signal. The signal is applied to the input of sample-and-hold circuit 228. Preferably, sample-and-hold circuit component 228 receives its clock input directly from divide-by circuit 239 (of FIG. 7A); however, alternatively, sample-and-hold circuit component 228 could receive its clock signal from digital signal processor 221. The output of sample-and-hold circuit component 228 is routed through amplifier 229 to the input of analog-to-digital circuit component 220. Preferably, analog-to-digital circuit component 220 is clocked by digital signal processor 221. The output of analog-to-digital circuit component 220 is provided to channel 1 of digital signal processor 221. In this manner, the signal developed by receiving antenna 231 is sampled at a frequency determined by divide-by circuit 239, or alternatively by a frequency established in a computer program executed by digital signal processors 221, or alternatively, by program resident and central processor 215, which is passed through digital signal processors 221 to sample-and-hold circuit component 228. The analog signal is digitized at a frequency determined by the clock input to analog-to-digital circuit component 220. It should be noted that divide-by circuit 239 (of FIG. 7A) provides a 24 kilohertz output, which is much lower in frequency than the output of reference clock 237 (of FIG. 7A); accordingly, the signal generated by receiving antenna 213 is sampled at a frequency which is much less than the Nyquist threshold for the interrogating electromagnetic field which is generated by transmitters 203, 205, 207, 209. The manner in which this sampling is conducted will be discussed in greater detail below.

Referring again to FIG. 7B, the generation of signals for channel 2 of digital signal processor 221 will now be discussed. As is evident from FIG. 7B, the circuitry which provides an input to channel 2 of digital signal processor 221 is identical to that for channel 1 of digital processor 221. The signal generated by receiving antenna 211 is applied through radio frequency amplifier 226 to sample-and-hold circuit component 230. Sample-and-hold circuit component 230 is clocked either directly by divide-by circuit 239 (of FIG. 7A) or by digital signal processor 221. The output of sample-and-hold circuit component 230 is applied through amplifier 231 to analog-to-digital circuit component 222. Analog-to-digital circuit component 222 is preferably clocked directly by digital signal processor 221. Sample-and-hold circuit component 230 is clocked at a frequency which is much less than the frequency of the interrogating electromagnetic field which is generated by transmitter antennas 203, 205, 207, and 209. Thus, the signal developed by receiving antenna 211 is sampled at a frequency which is much less than the Nyquist threshold for the interrogating signal.

The logging apparatus of the present invention utilizes bandpass sampling techniques which have not heretofore been utilized in logging devices. Principally, bandpass sampling technologies have been utilized in radio frequency communication systems. The following books and articles, which are incorporated herein by reference as if fully set forth, describe some of the broad concepts of bandpass sampling (alternatively identified as "undersampling") when utilized in radio frequency communication applications:

1. "UNDERSAMPLING TECHNIQUES SIMPLIFY DIGITAL RADIO By Sampling Below The Nyquist Rate With A New Type Of ADC, DESIGNERS CAN EXPLOIT THE BENEFITS OF DIGITAL RADIO", authored by Richard Groshong and Stephen Ruscak and published in the May 23, 1991 issue of *Electronic Design;*

2. "APPLICATIONS OF UNDERSAMPLING TECHNIQUES", authored by Jeff Kirsten and Tarlton Fleming, published in the August 1991 issue of *Electronic Engineering;*

3. "UNDERSAMPLING REDUCES DATA ACQUISITION COSTS", authored by Jeff Kirsten and Tarlton Fleming, published in the July 1991 issue of *Electronic Engineering;*

4. R. Vaughan, N. Scott, and D. White, "THE THEORY OF BAUDPASS SAMPLING", IEEE J. Signal Processing, Vol. 30–9, September 1991;

5. "DIGITAL SIGNAL PROCESSING PRINCIPLES, ALGORITHMS, AND APPLICATIONS", 1992, J. Probeis and D. Manolateis, MacMillan Publishing Company, New York, N.Y.;

6. "EXPLOIT DIGITAL ADVANTAGES IN AN SSB RECEIVER, IMPROVEMENTS IN DIGITAL CONVERSION TECHNOLOGY HELP RADIO DESIGNERS TAKE ADVANTAGE OF DIGITAL ARCHITECTURES", authored by Richard Groshong and Stephen Ruscak, published in the Jun. 13, 1991 issue of *Electronic Design;*

7. "PARAMETER ESTIMATION OF UNDERSAMPLED SIGNALS BY WIGNER-VILLE ANALYSIS", May 1991, authored by Sergio Barbarossa, published in *Spectral Estimation Audio And Electroacoustics,* 1991 *International Conference On Acoustics Speech And Signal Processing;*

8. "THE SAMPLING AND FULL RECONSTRUCTION OF BAND-LIMITED SIGNALS AT SUB-NYQUIST RATES", authored by W. H. Nicholson and A. A. Sakla, and published in the May 1990, in *IEEE International Symposium On Circuits And Systems;* and 9. "GENERALIZED SAMPLING THEOREM", authored by Yang-Ming Zhu, published in August 1992, Vol. 39, No. 8, of *IEEE Transactions On Circuits And Systems.*

Figure 7C:
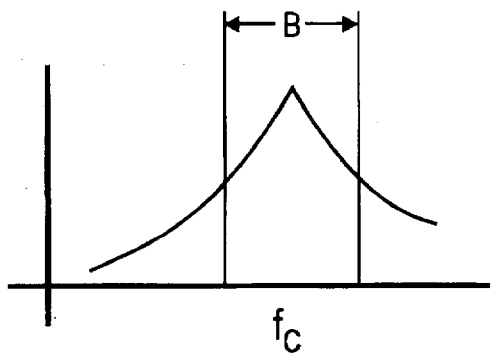
FIGS. 7C and 7D are graphical depictions of the bandpass sampling technique of the present invention.

The broad concept behind bandpass sampling can be described with reference to FIG. 7C. When sampling of a baudpass signal is signaled, such as that shown in FIG. 7C, one typically samples at a sampling rate above the Nyquist limit for the particular signal in question, utilizing the following equation:

$$f_{sample} = 2 \left( f_c + \frac{B}{2} \right) \quad \text{Equation 2.1}$$

However, this is only true in situations where one is interested in recovering information which identifies the carrier frequency $f_c$. Bandpass sampling may be utilized when one does not care or need to know the identity of the carrier frequency $f_c$. In the present invention, the frequency of the interrogating electromagnetic field is known with precision. In fact, it is known with much greater precision than has been available in prior art logging devices. Accordingly, bandpass sampling can be utilized to sample at frequencies much less than the Nyquist limit for the interrogating electromagnetic field, and much less than the carrier frequency but larger than twice the signal bandwidth B. In logging applications, the drillstring moves through the borehole at rates which are typically less than sixty feet per hour. The information being detected is changed in either or both of amplitude attenuation and phase shift of the interrogating electromagnetic field. Such changes are occurring at a rate far less than one cycle per second, and typically less than one-sixtieth of one hertz. Accordingly, the bandwidth of the signal plus noise is very small compared to the carrier frequency; therefore, sampling at the Nyquist rate for the interrogating signal is not required. For example, for a two megahertz interrogating signal, the Nyquist limit is four megahertz. Sampling at four megahertz is for all practical purposes impossible in logging applications. Therefore, in the prior art devices, heterodyning circuits are utilized to generate a much lower frequency signal which includes the information content, which can be sampled at a much lower rate (typically in the kilohertz or less range). In the present invention, the signals generated in the receiving antennas are directly digitized, without requiring heterodyning circuits, at a rate which is far less than the Nyquist limit, but also far less than the carrier frequency. For a two megahertz logging tool, utilizing the present invention, one may sample at rates in the range of 1 kilohertz to 80 kilohertz, without losing any information. At this much slower sampling frequency, direct digitization of the analog signal is possible, and the heterodyning circuitry can be eliminated. This greatly simplifies the construction, operation, and maintenance of the logging tool, and allows for the utilization of much smaller electronic housings which facilitate the manufacture of slim-hole logging tools which can be utilized in relatively narrow-diameter wellbores as well as in highly articulated wellbores.

Utilizing a bandpass sampling technique, in which the frequency of the carrier signal is known, the required sampling rate becomes twice the bandwidth of the signal or signals of interest. With reference to FIG. 7C, this sampling rate for bandpass sampling is two times the bandwidth B. Of course, sampling at a rate which is much higher than the relatively narrow bandwidth of the signal (in the neighborhood of fractions of hertz) is not difficult; therefore, the question remains: what sampling frequency should be utilized? High sampling rates are favored, since the lower the sampling rate, the greater the impact of phase noise upon the signal, and aliasing then becomes a problem.

In the present invention, these signal processing concerns are addressed by the selection and utilization of a quadrature sampling technique. Quadrature sampling is useful insofar as it eliminates automatically the influence of DC biases. The influence of high frequency noise is eliminated by utilizing averaging routines in digital signal processor 221 to average the samples recorded in memory of the circular buffers for channels one and two of digital signal processor 221.

Figure 7D:
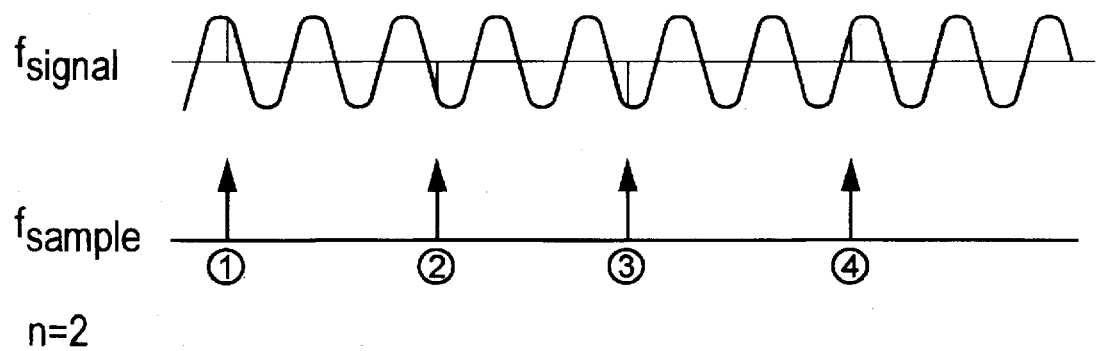

In quadrature sampling, each succeeding sample is a specifiable number of cycles of the signal frequency plus ninety degrees later than the previous sample. Quadrature sampling can be explained with reference to FIG. 7D. To obtain quadrature sampling, each sample is advanced a specified number of cycles plus ninety degrees from the previous sample. Quadrature sampling allows for any (or no) number of intervening cycles to occur. In the graphical depiction of FIG. 7D, each one of samples number 1, number 2, number 3, and number 4 is advanced 2 cycles plus ninety degrees from the previous sample. Quadrature sampling will allow for any particular number of cycles to occur between samples. For a given carrier or signal frequence, $F_c$, the frequency of sampling is determined in accordance with the following equation:

$$f_{sample} = \frac{f_c}{n + \frac{1}{4}}$$ Equation 2.2

Where n is the number of full cycles between samples.

The derivation of this equation is explained in Appendix I. In accordance with the present invention, a sampling rate of 24 kilohertz is utilized. This corresponds to sampling a 1.998 megahertz signal with n=83.

Figure 8A:
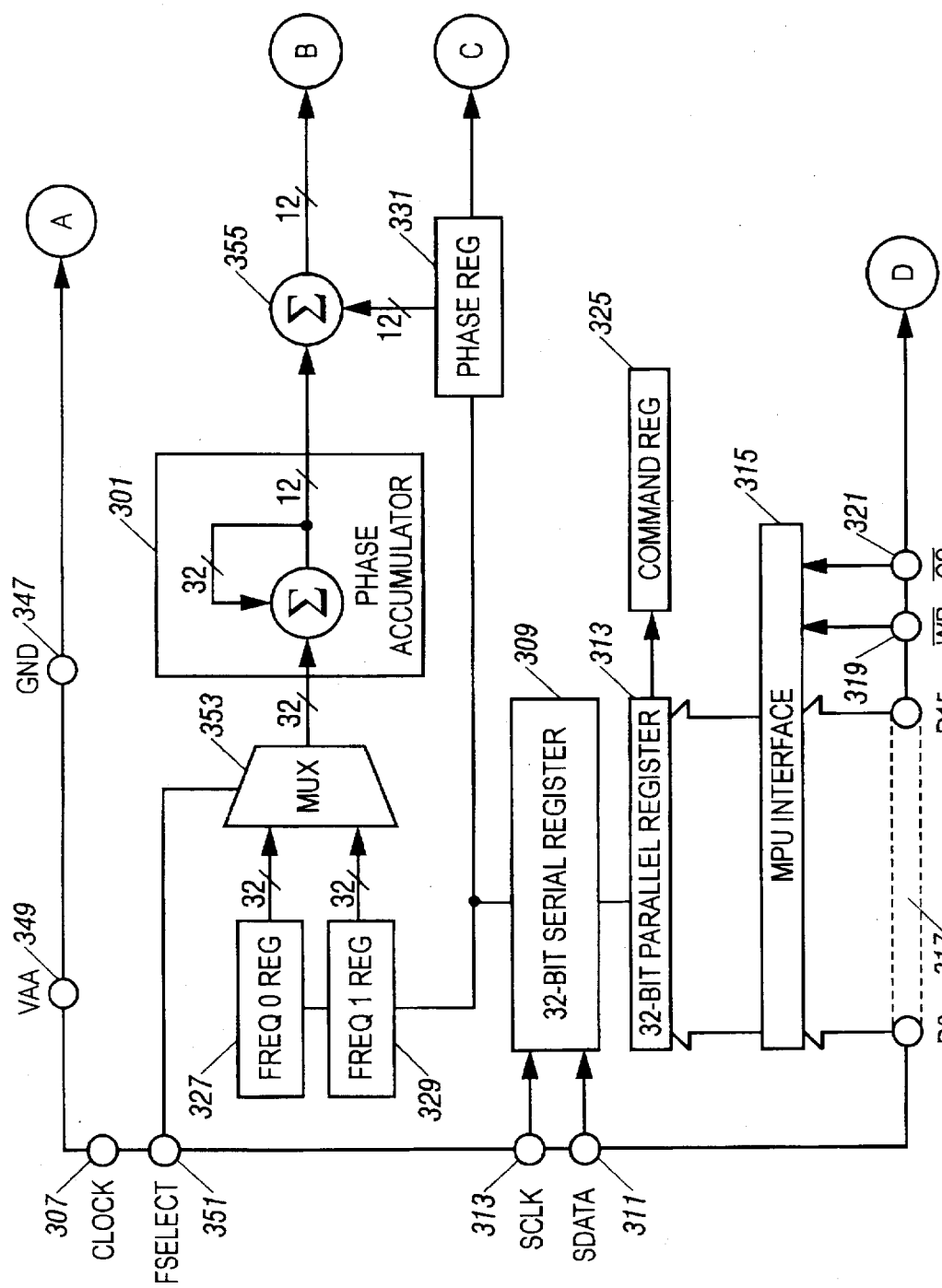
FIGS. 8A and 8B are block diagram views of the numerically-controlled oscillators of the block diagram of FIG. 6.
Figure 8B:
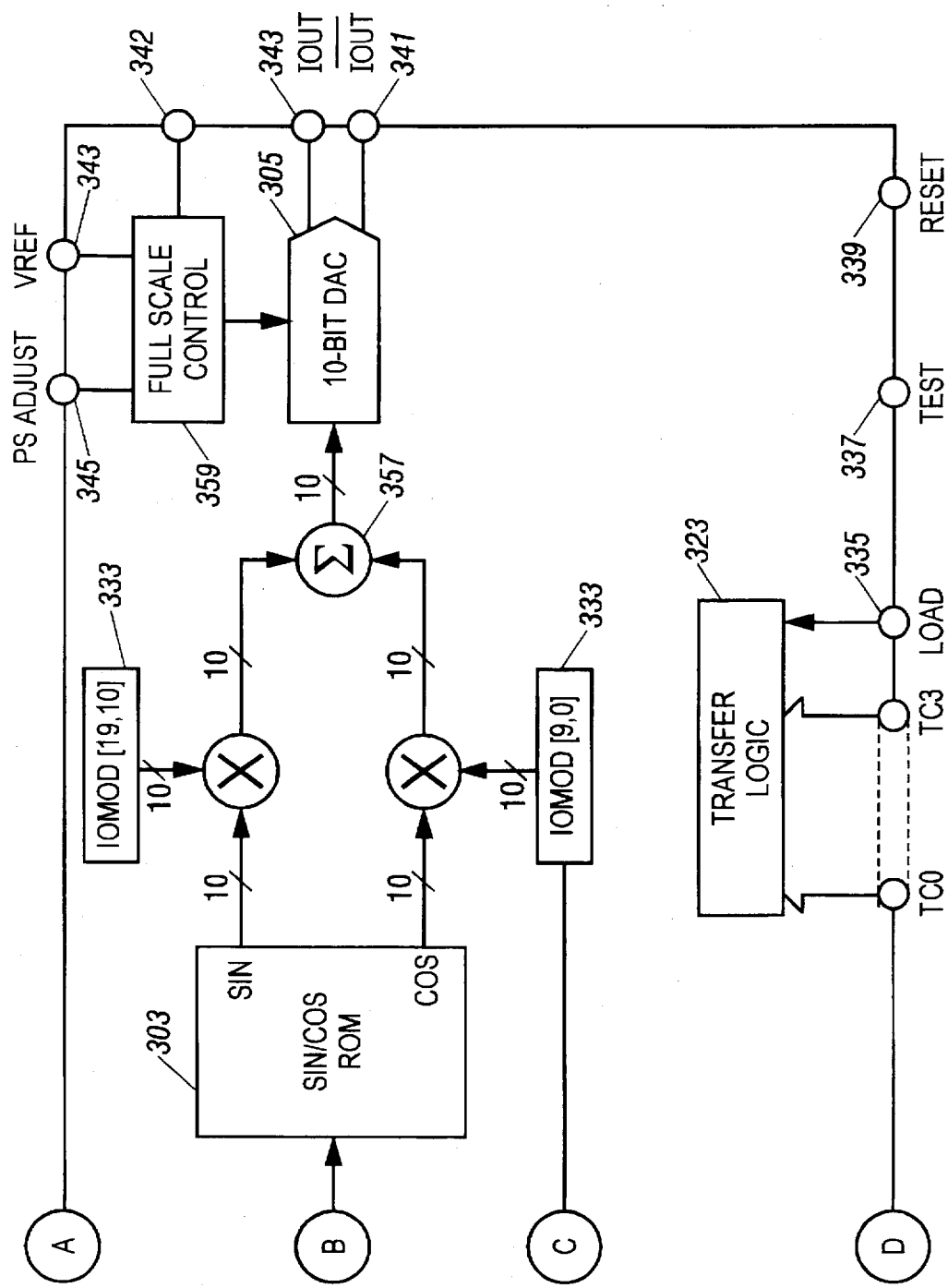

FIGS. 8A and 8B is a block diagram view of the numerically-controlled oscillators 223, 225 of FIG. 7A. Since the numerically-controlled oscillators are identical, only numerically-controlled oscillator 223 will be discussed and described. In the preferred embodiment of the present invention, numerically-controlled oscillator 223 comprises a CMOS, DDS modulator manufactured by Analog Devices of Norwood, Mass., which is identified by Model No. AD7008. The numerically-controlled oscillator 223 includes a thirty-two bit phase accumulator 301, a sine and cosine look-up table 303, and a ten-bit digital to analog converter 305. Clock input 307 is provided to receive a clocking signal from a device which is external to the numerically-controlled oscillator 223. The particular numerically-controlled oscillator of the present invention is adapted to accept clock rates as high as twenty megaHertz to fifty megaHertz, but can accommodate much lower clock rates. The device purports to have a frequency accuracy which can be controlled to one part in four billion. Numerically-controlled oscillator 223 includes a thirty-two bit serial register 309 which receives serial data at serial data input pin 311, which is clocked into the register in accordance with a clock signal which is supplied to serial clock input 313. A thirty-two bit parallel register 313 is also provided which receives parallel binary data from MPU interface 315. Data bus 317 includes sixteen digital input pins identified as D0 through D15. The chip select pin 321 is utilized when writing to the parallel register 313. The write pin 319 is also utilized when writing to the parallel register 309. The transfer control address bus 323 is utilized to determine the source and destination registers that are used during a transfer. A source register can be either the parallel assembly register 313 or the serial assembly register 309. The destination register can be any one of the following registers: the command register 325, the FREQ0 register 327, the FREQ1 register 329, the phase register 331, the IQMOD register 333. The command register is written to only through the parallel assembly register 313. The contents of the command register determine the operating state of the numerically-controlled oscillator 223. In the preferred device utilized in the present invention, the command register is a four bit register. The content of this register determines the operating state of the numerically-controlled oscillator. Table 1 provides an overview of the possible operating states of the numerically-controlled oscillator 223 which is utilized in the present invention. During logging operations, the logging apparatus of the present invention is programmed to provide commands from processors 215, 217, 219 (of FIG. 7A) with eight-bit commands, so the "CR0" bit is 0. Normal operation is desired, so the "CR1" bit is 0. In the present invention, amplitude modulation is bypassed, so the "CR2" bit is 0. In the present invention, the synchronizer logic is enabled, so the "CR3" bit is 0. The FREQ0 register 327 defines the output frequency of the numerically-controlled oscillator 223, when the FSELECT pin is 1, as a fraction of the frequency of the clock signal applied to clock pin 307. The FREQ1 register 329 defines the output frequency of the numerically-controlled oscillator 223, when FSELECT equals 1, as a frequency of the clock signal applied to clock pin 307. The contents of the phase register 331 are added to the output of the phase accumulator 301. The IQMOD register 333 is not utilized in the present invention.

The operations which can be performed with the registers by supplying command signals to transfer control address bus 323 are set forth in tabular form in tables 2 and 3. Three basic operations can be performed. The contents of the parallel assembly register 313 can be transferred to command register 325; the contents of the parallel assembly register can be transferred to a selected destination register, in accordance with the destinations identified in table 3; and the contents of the serial assembly register 309 can be transferred to a selected destination register of those identified in table 3.

The load register pin 335 is utilized in conjunction with the transfer control address bus 323 to control loading of internal registers from either the parallel or serial assembly registers 309, 313. The test pin 337 is utilized only for factory testing. The reset pin 339 is utilized to reset the registers. The reset pin in particular is utilized to clear the command register 325 and all the modulation registers to 0. The current output pins 341, 343 are utilized to supply an alternating current to a selected end device. In the particular embodiment of the present invention, only one of these outputs is utilized for a particular transmitting antenna, since one current is the compliment of the other current. The compensation pin 342 is utilized to compensate for the internal reference amplifier. The voltage reference pin 343 can be utilized to override an internal voltage reference, if required. The full-scale adjust pin 345 determines the magnitude of the full scale current at output pins 341, 343. The ground pin 347 provides a ground reference, while the positive power supply pin provides power for the analog components within numerically-controlled oscillator 323. The frequency select pin 351 controls frequency registers FREQ0 register 327 and FREQ1 register 329, by determining which register is used in the phase accumulator 301 by controlling multiplexer 353. The contents of phase register 331 is added to the output of phase accumulator 301 at sumer 355. The IQMOD registers 333 are provided to allow for either quadrature amplitude modulation or amplitude modulation, so the sine and cosine outputs of look-up table 303 are added together at sumer 357, and are unaffected by the IQMOD registers 333. The output of sumer 357 is provided to digital-to-analog converter 305, which creates an analog signal having a frequency which corresponds to either the contents of the FREQ0 register 327 or the FREQ1 register 329, a phase which is determined by the output of sumer 355 which is provided as an input to look-up table 303, and an amplitude which is determined by full scale control 359 which is set by full scale adjust pin 345 and reference voltage pin 343. Therefore, the numerically-controlled oscillator of FIGS. 8A and 8B can provide an analog output having a precise frequency attribute, phase attribute, and amplitude attribute. Since the device is extremely accurate, it is possible to provide a driving current for the transmitting antennas 203, 205, 207, 209 of FIG. 7A which is controlled precisely. In the preferred embodiment of the present invention, one of transmitting antennas 203, 205 is operated at 400 kiloHertz, while the other of transmitting antennas 203, 205 is operated at 2 megaHertz. The same is true for antennas 207, 209, with one being operated at 400 kiloHertz and the other being operated at 2 megaHertz. However, the processors 215, 217, 219 can be programmed to provide any particular frequencies for the transmitting antennas. This will be used to good advantage as will be described below in connection with a calibration routine.

In operation, a command signal is supplied to the FSELECT pin 351 to determine which frequency will be utilized for energizing a particular transmitting antenna. The FREQ0 register 327 and FREQ1 register 329 may be preloaded with two particular frequencies (such as 400 kiloHertz and 2 megaHertz). The binary signal applied to the FSELECT pin 351 determines the operation of multiplexer 353, which supplies the contents of either FREQ0 register 327 or FREQ1 register 329 of the input of phase accumulator 301. Phase accumulator 301 accumulates a phase step on each clock cycle. The value of the phase step determines how many clock cycles are required for the phase accumulator to count two $\pi$ radians, that is, one cycle of the output frequency. The output frequency is determined by the phase step multiplied by the frequency of the signal applied to the clock input pin 307 divided by $2^{32}$. In practice, the phase accumulator 301 is cleared, then loaded with the output of multiplexer 353. Then, a predefined time interval is allowed to pass, during which the signal applied to clock input pin 307 steps the output of phase accumulator 301 through an incrementally increasing phase for the particular frequency. In other words, phase accumulator steps from 0° phase to 180° for a particular frequency. At any time, the output of phase accumulator 301 may be altered by a phase offset which is supplied by phase register 331. Phase register 331 may be loaded in response to commands from processors 215, 217, 219. The phase value is supplied as input to look-up table 303, which converts the output of the phase accumulator 301 (and any desired offset) into a digital bit stream which is representative of an analog signal. This digital bit stream is supplied as an input to the 10-bit digital-to-analog converter 305 which also receives amplitude information from full scale control 359. The digital-to-analog converter 305 supplies an analog output with a particular frequency attribute, phase attribute, and amplitude attribute. For example, an output of 2 megaHertz, with 15° of phase, and a particular peak amplitude current may be provided as an input to a particular transmitting antenna.

Figure 9:
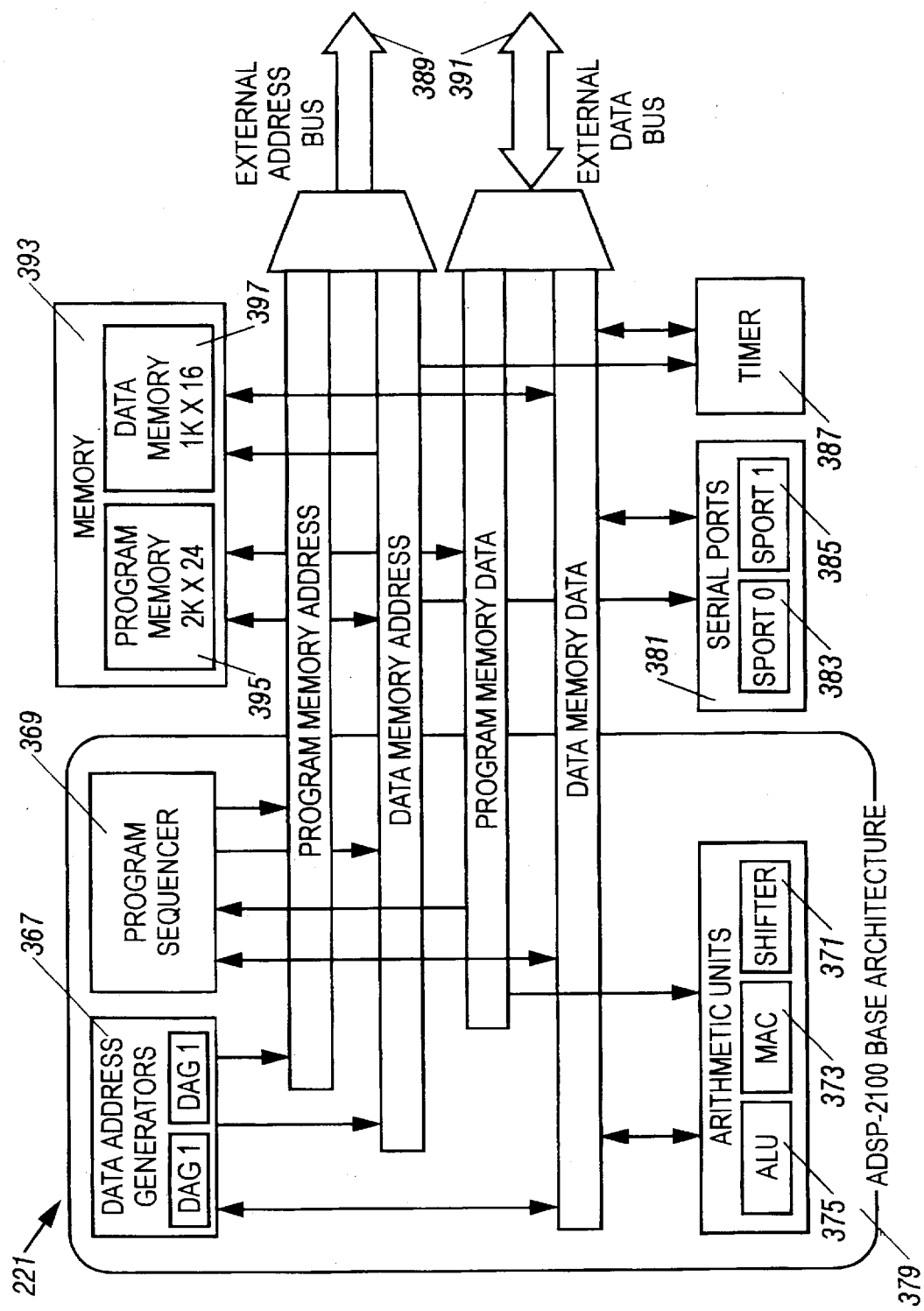
FIG. 9 is a block diagram view of the digital signal processor of the block diagram of FIG. 6.

FIG. 9 is a block diagram view of the digital signal processor 221 of FIG. 6A. In the preferred embodiment of the present invention, digital signal processor 221 comprises a DSP microcomputer manufactured by Analog Devices of Norwood, Mass., which is identified as Model No. ADSP-2101. This is a single-chip microcomputer which is utilized for high-speed numeric processing applications. Its base architecture 379 is a fully compatible superset of the ADSP-2100 instruction set. The base architecture includes three independent computational units: shifter 371, multiplier/accumulator 373, and arithmetic and logic unit (ALU) 375. Program sequencer 369 supports a variety of operations including conditional jumps, subroutine calls, and returns in a single cycle. Data address generator 367 includes two address generators. Digital signal processor 221 includes serial port 381 which includes two input channels: input channel 383, and input channel 385. Timer 387 provides timing signals for the data processing operation, and receives as an input a clock signal from divide-by circuit 239 (of FIG. 7A). External address bus 289 and external data bus 391 allow digital communication between digital signal processor 221 and central processor 315 of FIG. 7A. Memory 393 includes program memory 395 and data memory 397. As is typical with digital signal processors, data memory 397 defines at least two circular buffers associated with serial ports 383, 385, which are designed to receive asynchronous digital data, and store it indefinitely or for a predetermined time interval. The digital signal processor 221 receives digital inputs at channel inputs 383, 385 from an analog-to-digital converter, such as is depicted in the circuit of FIG. 7B. The receiving circuit of FIG. 7B receives a current which is representative of the response of a particular receiving antenna 211, 213 to electromagnetic radiation propagating through the borehole. This electrical signal is processed through the circuit components of FIG. 7B, and is provided as an input to digital signal processor 221. In the preferred embodiment of the present invention, receiving antenna 211 is identified with a particular input channel of digital processor 221, while receiving antenna 213 is identified with the other input channel of digital signal processor 221. Central processor 215 (of FIG. 7A) utilizes external address bus 389 and external data bus 391 to address a particular input channel and read digital data into central processor 215 for processing. In the preferred embodiment of the present invention, digital signal processor 221 can sample data from receiving antennas 211, 213 at a very high sampling rate, which can be read periodically by central processor 215 which processes the data to determine the amplitude attenuation and phase shift of the electromagnetic signal which is propagated through the borehole. One particular routine for calculating amplitude attenuation and phase shift is set forth in greater detail herebelow, in connection with a discussion of the error cancellation feature of the present invention. In broad overview, central processor 215 can pull a selected amount of data from each channel of digital signal processor 221, and from that data calculate the amplitude attenuation and phase shift of the electromagnetic wave as it propagates through the wellbore and past receiving antenna 211 and receiving antenna 213. In the preferred embodiment of the present invention, an upper transmitter transmits an interrogating electromagnetic signal of a particular frequency which propagates downward past receiving antennas 211, 213. Then, a particular one of lower transmitting antennas 207, 209 propagate an interrogating electromagnetic signal upward. Measurements from receiving circuit 231 are stored in the input channels of digital signal processor 221, and read by central processor 215 in a manner which allows for the calculation of amplitude attenuation and phase shift.

Another important feature of the present invention arises from the fact that a precise energizing current can be utilized to energize a particular one of transmitting antennas 203, 205, 207, 209. This will establish the frequency attribute, phase attribute, and amplitude attribute of the electromagnetic interrogating signal. Therefore, a single receiving antenna can be utilized to make the measurement of the electromagnetic interrogating signal as it passes through the wellbore. The amplitude and phase of that interrogating signal can be recorded in memory, and compared with values in memory for the energizing current. This allows a single receiving antenna to be used to provide an accurate measure of amplitude attenuation between that particular receiving antenna and the particular transmitting antenna, and the phase shift of the interrogating signal between the transmitting antenna and the receiving antenna. Of course, the amplitude attenuation and phase shift of the electromagnetic interrogating signal as it passes through the formation is indicative of the resistivity of the wellbore and surrounding formation.

Figure 10A:
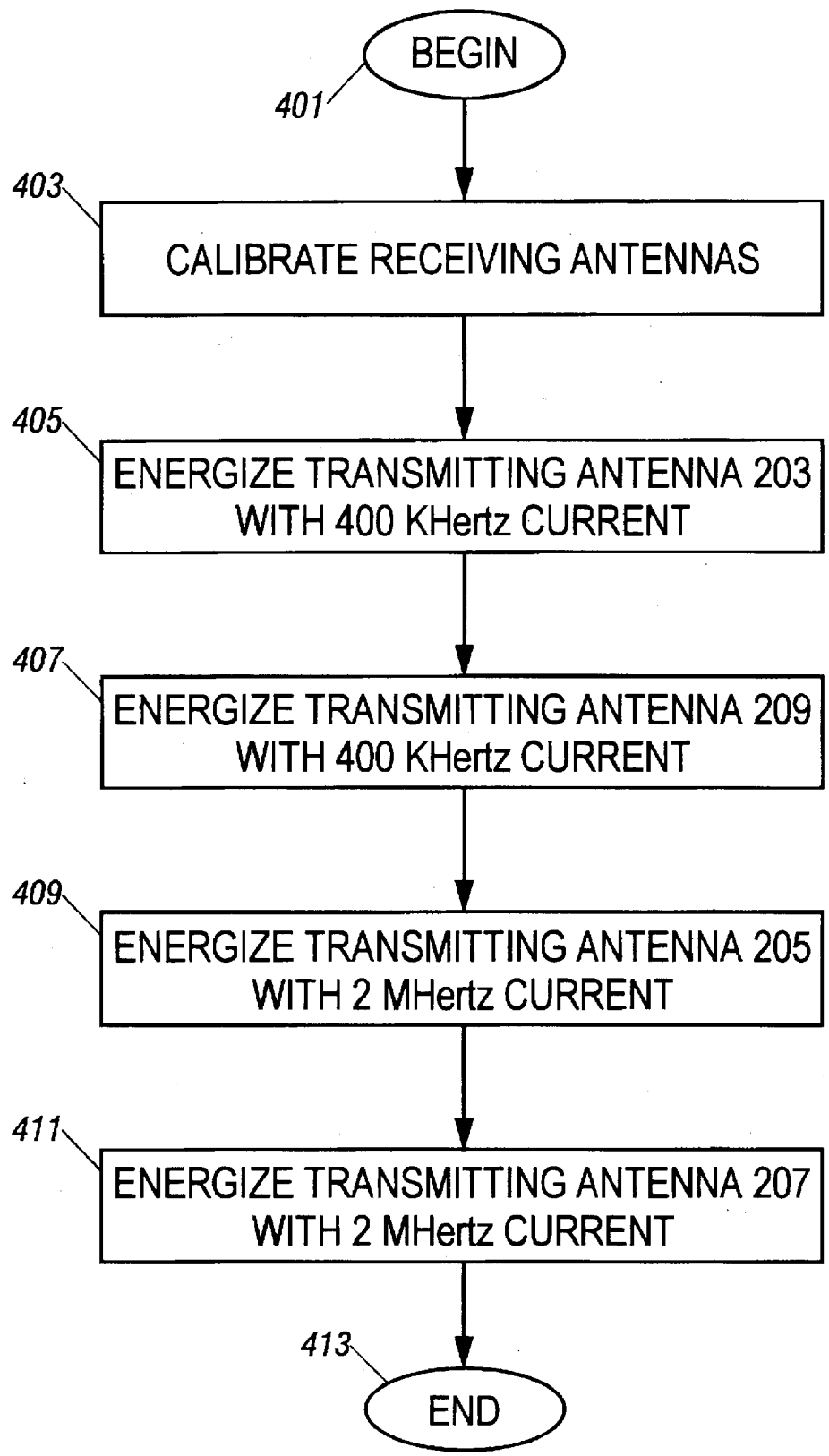
FIGS. 10A, 10B, and 10C, are high level flowchart representations of tool operation in accordance with the preferred embodiment of the present invention.
Figure 10B:
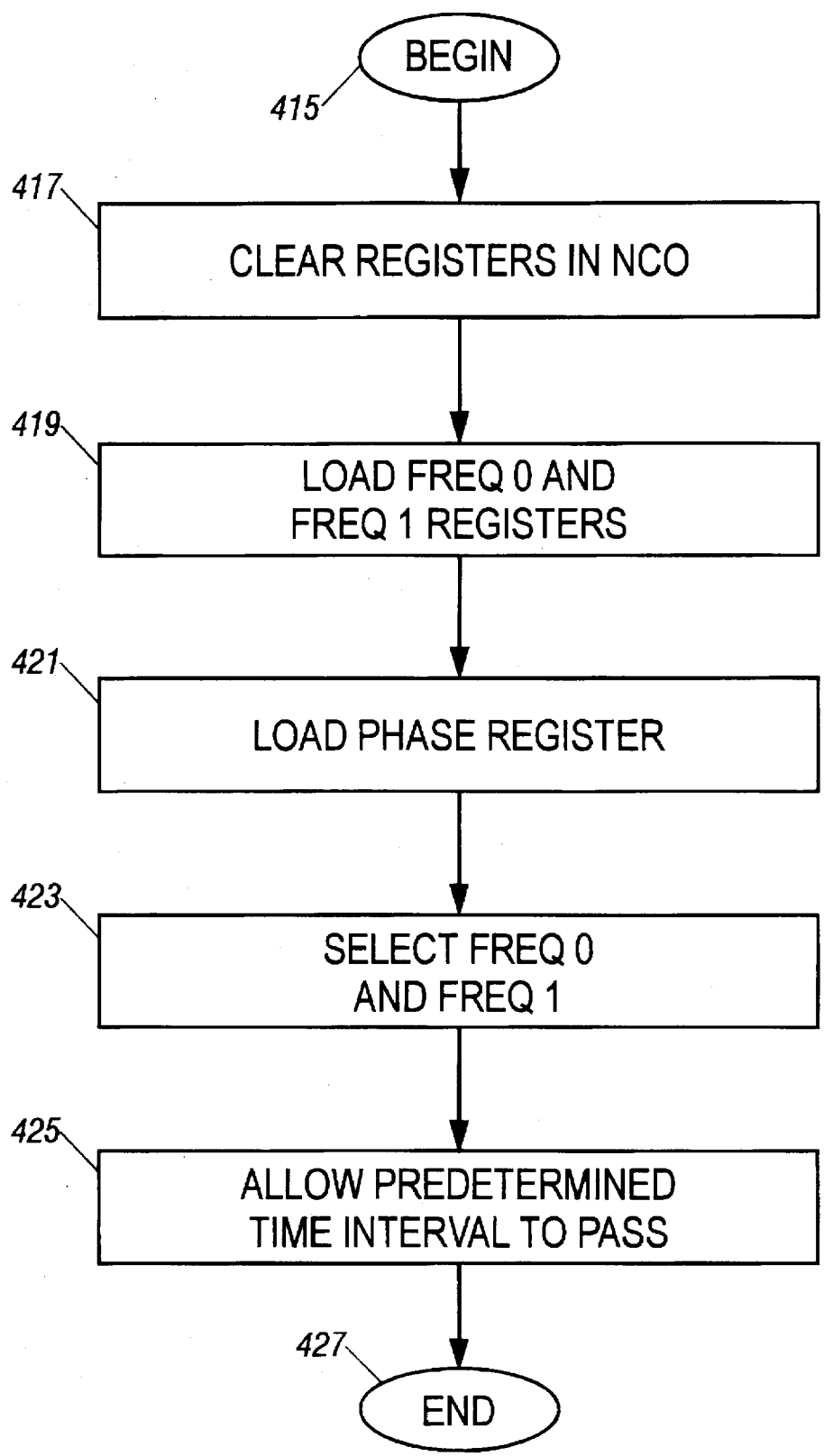
Figure 10C:
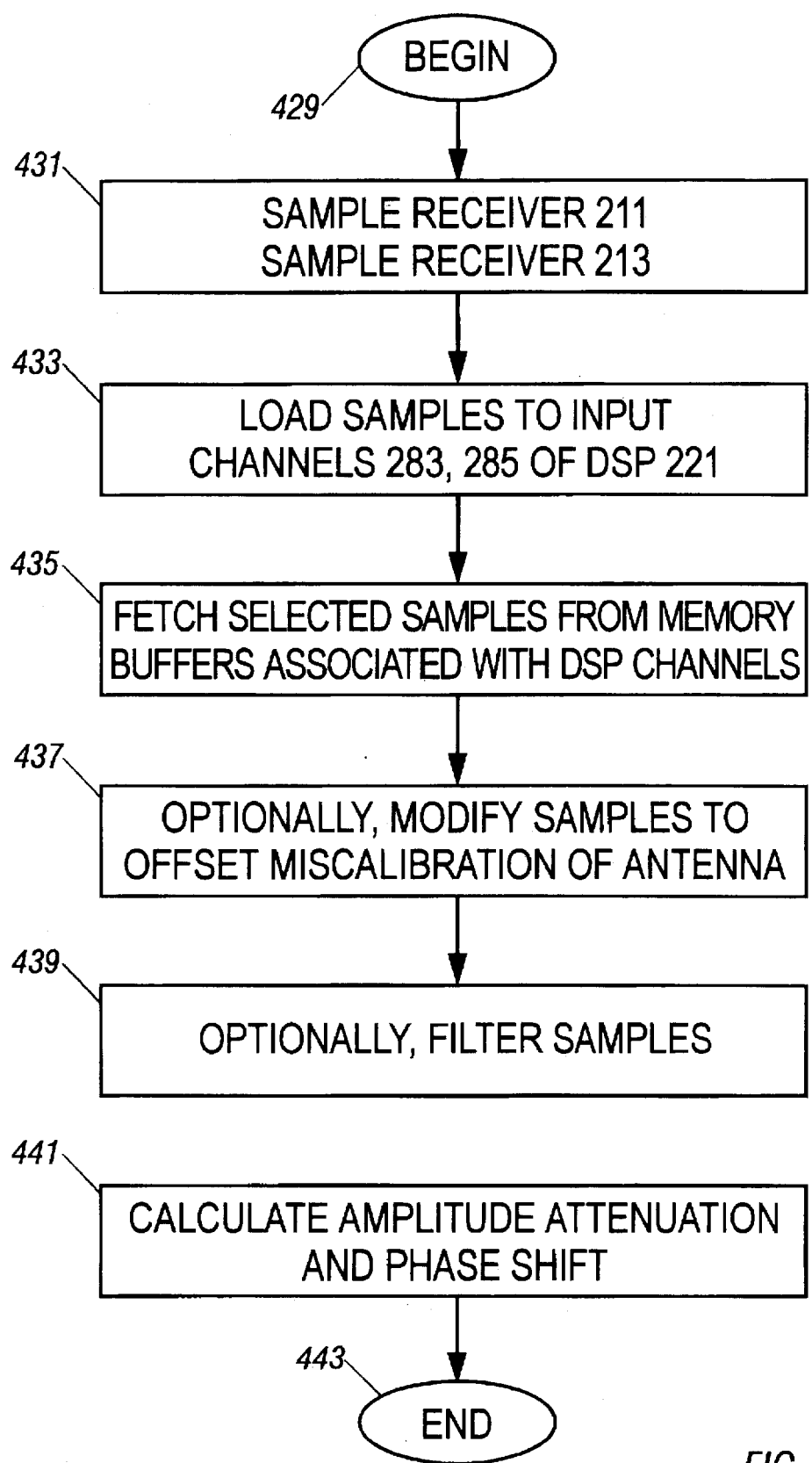

FIGS. 10A, 10B, and 10C provide high level flowchart representations of logging operations performed in accordance with the preferred embodiment of the present invention. FIG. 10A depicts logic steps which are performed by central processor 215. FIG. 10B represents operations controlled by processors 217, 219. FIG. 10C depicts operations controlled by digital signal processor 221 and central processor 215. The transmission operations begin at block 401. Processor 215 performs a calibration operation upon receiving antennas 211, 213, as will be discussed in greater detail elsewhere in this application. After the calibration operations are performed central processor 215 instructs processor 217 to energize transmitting antenna 203 with a 400 kilo-Hertz current. Then, in accordance with block 407, central processor 215 instructs processor 219 to energize transmitting antenna 209 with a 400 kiloHertz current. Next, central processor 215 instructs processor 217 to energize transmitting antenna 205 with a 2 megaHertz current, in accordance with block 409. Then, in occurrence with block 411, central processor 215 instructs processor 219 to energize transmitting antenna 207 with a 2 megaHertz current. The process stops at block 413. In actual practice, transmission operations will be performed continuously over predefined intervals.

FIG. 10B depicts the control operations performed by processors 217, 219 to cause numerically controlled oscillators 223, 225 to energize particular transmitters. The process begins at block 415. It continues at block 417, wherein the processor 217 or 219 clears the registers in numerically controlled oscillators 223 or 225 by providing the appropriate instruction. Then, in accordance with block 419, processor 217 or 219 loads a predetermined value to the FREQ0 register and the FREQ1 register. These values determine the frequency of the energizing current which is supplied to a particular transmitting antenna. Then, in accordance with block 421, processor 217 or 219 loads a predetermined phase value to the phase register of numerically controlled oscillator 223 or 225. Processor 217 or 219 then provides a binary command to the FSELECT input pin of numerically controlled oscillator 223 or 225 to select a particular frequency of operation. Then, in accordance with block 425, a particular time interval is allowed to pass. This time interval determines how many cycles of energizing current are applied to a particular transmitting antenna. The process ends at software block 427. Typically, each time processor 217 or 219 is instructed by central processor 215 to energize a particular transmitting antenna, the steps of FIG. 10B are performed.

FIG. 10C depicts in flowchart for the reception operations. The process begins at block 429. The process continues at block 431, wherein the current within receiving antennas 211, 213 are sampled by receiving circuit 231. Then, in accordance with block 433, these samples are loaded to the appropriate input channels 283, 285 of digital signal processor 221. In accordance with block 435, central processor 215 fetches selected samples from the memory buffers associated with the digital signal processor input channels. In accordance with block 437, optionally, samples may be modified to offset for error components due to "miscalibration" of the antenna, which will be described in greater detail elsewhere in this application. Next, in accordance with software block 439, the digital samples may be digitally filter with either a low-pass digital filter, high-pass digital filter, or a bandpass digital filter. Alteratively, the samples can be averaged over predefined intervals to provide stability to the samples and eliminate the influence of spurious or erroneous samples. Next, in accordance with block 441, the amplitude attenuation and phase shift are calculated, as is described elsewhere in this application. Finally, the process ends at block 443.

While the invention has been shown in only one of its forms, it is not thus limited but is susceptible to various changes and modifications without departing from the spirit thereof.

Appendix 1
Quadrature Band Pass Sampling

The signal received from a particular transmitter at a frequency $F_s$ can in general be represented by $$S(t) = A(t)\cos[2\pi F_s t + \phi(t)] + O_{ff} \quad (1)$$

where
$A(t)$ is the amplitude of the signal,
$\phi(t)$ is the phase of the signal, and
$O_{ff}$ is an electronic offset. By using a trigonometric relation we can expand equation (1).

$$S(t) = \frac{A(t)}{2}\{\cos\phi(t)\cos 2\pi F_s t - \sin\phi(t)\sin 2\pi F_s t\} + O_{ff} \quad (2)$$

For quadrature bandpass sampling, samples may be separated by an arbitrary number of cycles $n$, of the signal frequency $F_s$, plus $\frac{\pi}{2}$ radians. To find the interval between samples $\tau$, note that if $k\tau$ are the sampling times, where $k = 0,1,2,3 \ldots$, then we may write $$2\pi F_s k\tau + 2n\pi + \frac{\pi}{2} = 2\pi F_s[(k+1)\tau]. \quad (3)$$

Where $k\tau$ is the time of a particular sample and $k(\tau + 1)$ is the time of the succeeding sample.
Solving for $\tau$ we have $$\tau = \frac{n + \frac{1}{4}}{F_s}. \quad (4)$$

Substitute equation (4) into (1) and substitute $k\tau$ for $t$, where $k$ is the sampling integer, the terms are $$\cos 2\pi F_s k\tau = \cos\frac{\left\{2\pi F_s\left(n+\frac{1}{4}\right)k\right\}}{F_s} = \cos\frac{k\pi}{2} \quad (5)$$

$$= 1,0,-1,0,1,\ldots \text{ for } k=0,1,2,3,4,\ldots$$

and $$\sin 2\pi F_s k\tau = \sin\frac{\left\{2\pi F_s\left(n+\frac{1}{4}\right)k\right\}}{F_s} = \sin\frac{k\pi}{2}$$

$$= 0,1,0,-1,0,1,\ldots \text{ for } k=0,1,2,3,4,\ldots$$

For the even numbered samples only (note that the sin term in (5) is zero), we have $$S_e(k\tau) = \frac{A(k\tau)}{2}\cos\phi(k\tau)(-1)^{\frac{k}{2}} + O_{ff}k = 0,2,4,\ldots \quad (6)$$

Multiply by $(-1)^{\frac{k}{2}}$ and average over the $k$ variable for a measurement period which approaches an ergodic average to obtain $$\overline{S_e(k\tau)} = \frac{A(k\tau)}{2}\cos\{\phi(k\tau)\}(-1)^k + O_{ff}(-1)^{\frac{k}{2}} \quad (7)$$

since $(-1)^k = 1$ for $k$ even, and since $(-1)^{\frac{k}{2}} =$ 0 for $k$ even we have $$\overline{S_e(k\tau)} = \frac{A(k\tau)}{2}\cos\{\phi(k\tau)\}. \quad (8)$$

Approximate $A(k\tau)$ and $\phi(k\tau)$ by
$A(k\tau) = A_0 + \epsilon_a(k\tau)$ \quad (9)
$\phi(k\tau) = \phi_0 + \epsilon_\phi(k\tau)$, \quad (10)
where $\epsilon_a(k\tau)$ and $\epsilon_\phi(k\tau)$ are small, uncorrelated, zero mean, random noise variables, and $A_0$ and $\phi_0$ are stationary amplitude and phase values for the duration of a single measurement. Then after substitution we obtain -continued
Appendix 1
Quadrature Band Pass Sampling $$\overline{S_e(k\tau)} = \frac{1}{2} \overline{[A_0 + e_a(k\tau)]\cos\{\phi_0 + e_\phi(k\tau)\}} \quad (11)$$

$$= \frac{1}{2} \overline{[A_0 + e_a(k\tau)][\cos\phi_0\cos\{e_\phi(k\tau)\} - \sin\phi_0\sin\{e_\phi(k\tau)\}]}$$

$$= \frac{A_0}{2} \overline{\cos\phi_0\cos\{e_\phi(k\tau)\}} - \frac{A_0}{2} \overline{\sin\phi_0\sin\{e_\phi(k\tau)\}} +$$

$$\frac{\overline{e_a(k\tau)}}{2} \cos\phi_0\cos\{e_\phi(k\tau)\} -$$

$$\frac{\overline{e_a(k\tau)}}{2} \sin\phi_0\sin\{e_\phi(k\tau)\}.$$

All of the terms in equation (11) except the first average to zero because $e_\phi(k\tau)$ and $e_a(k\tau)$ are small, uncorrelated, zero mean, random variables. $\sin\{e_\phi(k\tau)\}$ averages to zero, and $\cos\{e_\phi(k\tau)\}$ averages to one, leaving $$\overline{S_e(k\tau)} = \frac{A_0}{2} \cos\phi_0. \quad (12)$$

Similarly for the odd samples $$\overline{S_o(k\tau)} = \frac{A_0}{2} \sin\phi_0. \quad (13)$$

These average values are then solved for $A_0$ and $\phi_0$ for the desired result.

-continued
Appendix 1
Quadrature Band Pass Sampling $$\overline{S_e(k\tau)}^2 + \overline{S_o(k\tau)}^2 = \frac{A_0^2}{4}(\cos^2\phi_0 + \sin^2\phi_0) = \frac{A_0^2}{4}$$

$$A_0 = 2\sqrt{\overline{S_e(k\tau)}^2 + \overline{S_o(k\tau)}^2} \quad (14)$$

$$\tan\phi_0 = \frac{\frac{A_0}{2}\sin\phi_0}{\frac{A_0}{2}\cos\phi_0}$$

$$\phi_0 = \arctan\left\{\frac{-\overline{S_o(k\tau)}}{\overline{S_e(k\tau)}}\right\} \quad (15)$$

TABLE 1

Command Register Bits

| | | |
|---|---|---|
| CR0 | =0 | Eight-Bit Databus. Pins D15–D8 are ignored and the parallel assembly register shifts eight places left on each write. Hence four successive writes are required to load the 32-bit parallel assembly register, FIG. 6. |
| | =1 | Sixteen-Bit Databus. The parallel assembly register shifts 16 places left on each write. Hence two successive writes are required to load the 32-bit parallel assembly register, FIG. 5. |
| CR1 | =0 | Normal Operation. |
| | =1 | Low Power Sleep Mode. Internal Clocks and the DAC current sources are turn off. |
| CR2 | =0 | Amplitude Modulation Bypass. The output of the sine LUT is directly sent to the DAC. |
| | =1 | Amplitude Modulation Enable. IQ modulation is enabled allowing AM or QAM to be performed. |
| CR3 | =0 | Synchronizer Logic Enabled. The FSELECT, LOAD and TC3–TC0 signals are passed through a 4-stage pipeline to synchronize them with the CLOCK frequency, avoiding metastability problems. |
| | =1 | Synchronizer Logic Disabled. The FSELECT, LOAD and TC3–TC0 signals bypass the synchronization logic. This allows for faster response to the control signals. |

TABLE 2

AD7008 Control Registers

| Register | Size | Reset State | Description |
|---|---|---|---|
| COMMAND REG | 4 Bits CR3–CR0 | All Zeros | Command Resister. This is written to using the parallel assembly register. |
| FREQ0 REG | 32 Bits DB31–DB0 | All Zeros | Frequency Select Register 0. This defines the output frequency, when FSELECT = 0, as a fraction of the CLOCK frequency. |
| FREQ1 REG | 32 Bits DB31–DB0 | All Zeros | Frequency Select Register 1. This defines the output frequency, when FSELECT = 1, as a fraction of the CLOCK frequency. |
| PHASE REG | 12 Bits DB11–DB0 | All Zeros | Phase Offset Register. The contents of this register is added to the output of the phase accumulator. |
| IQMOD REG | 20 Bits DB19–DB0 | All Zeros | I and Q Amplitude Modulation Register. This defines the amplitude of the I and Q signals as 10-bit two complement binary fractions. DB[19:10] is multiplied by the Quadrature (sine component and DB[9:0] is multiplied by the In-Phase (cosine) component. |

TABLE 3

| | | | | | Source and Destination Registers | |
|---|---|---|---|---|---|---|
| TC3 | TC2 | TC1 | TC0 | LOAD | Source Register | Destination Register |
| X | X | X | X | 0 | N/A | N/A |
| 0 | 0 | X | X | 1 | Parallel | COMMAND |
| 1 | 0 | 0 | 0 | 1 | Parallel | FREQ0 |
| 1 | 0 | 0 | 1 | 1 | Parallel | FREQ1 |
| 1 | 0 | 1 | 0 | 1 | Parallel | PHASE |
| 1 | 0 | 1 | 1 | 1 | Parallel | IQMOD |
| 1 | 1 | 0 | 0 | 1 | Serial | FREQ0 |
| 1 | 1 | 0 | 1 | 1 | Serial | FREQ1 |
| 1 | 1 | 1 | 0 | 1 | Serial | PHASE |
| 1 | 1 | 1 | 1 | 1 | Serial | IQMOD |

What is claimed is:

1. A logging apparatus for use in a wellbore for determining an attribute of at least one of (a) said wellbore, and (b) a surrounding formation, when said logging apparatus is conveyed into said wellbore, comprising:

a housing;

at least one transmitter carried by said housing, each transmitter being individually and selectively operable for producing an electromagnetic interrogating signal at a selected interrogation frequency for passage through said wellbore and said surrounding formation;

at least one receiver, carried by said housing in a selected position relative to said at least one transmitter, each receiver being tuned to receive electromagnetic signals at said interrogation frequency to the exclusion of other frequencies;

wherein a portion of said at least one of (a) said wellbore, and (b) said surrounding formation has an attribute value which can be derived from at least one of (a) amplitude attenuation of said electromagnetic interrogating signal as determined from measurements of said electromagnetic interrogating signal taken through said at least one receiver, and (b) phase shift of said electromagnetic interrogating signal as determined from measurements of said electromagnetic interrogating signal taken through said at least one receiver;

a sampling circuit for sampling signals from said at least one receiver at a sampling frequency which is less than the interrogation frequency;

a controller member for (a) selectively energizing said at least one transmitter causing said electromagnetic interrogating signal to pass through said wellbore and said surrounding formation in a particular direction relative to said at least one receiver, (b) for selectively obtaining measurements of said electromagnetic interrogating signal from said at least one receiver with said sampling circuit, and (c) determining a measure of said attribute value.

2. A logging apparatus according to claim 1:

wherein said attribute comprises formation resistivity; and wherein said controller member determines an accurate measure of said formation resistivity.

3. An apparatus according to claim 1, wherein said at least one receiver comprises:

first and second receivers, carried by said housing in a selected position relative to said at least one transmitter, each receiver being tuned to receive electromagnetic signals at said interrogation frequency to the exclusion of other frequencies.

4. A logging apparatus according to claim 1, wherein:

said at least one transmitter comprises first and second transmitters, spaced apart a selected distance on said housing, each transmitter being individually and selectively operable for producing an electromagnetic interrogating signal at a selected interrogation frequency for passage through portions of said wellbore and surrounding formation; and wherein said at least one receiver comprises first and second receivers, spaced apart a selected distance on said housing in a selected position relative to said first and second transmitters, each receiver being tuned to receive electromagnetic signals at said interrogation frequency to the exclusion of other frequencies.

5. A logging apparatus according to claim 1, further including:

at least one drive circuit, electrically coupled between said at least one transmitter and said controller member, for selectively energizing said at least one transmitter in response to commands from said controller member.

6. A logging apparatus according to claim 1, wherein said controller member determines an accurate measure of said attribute value by combining samples.

7. A logging apparatus according to claim 1, wherein said sampling circuit includes for each of said at least one receiver:

a sample and hold circuit for obtaining samples of measurements from a particular one of said at least one receiver, in response to a digital command signal; and an analog-to-digital circuit for digitizing measurements obtained by said sample and hold circuit in response to a digital command signal.

8. A logging apparatus according to claim 7:

wherein said controller member provides said digital command signal to (a) said sample and hold circuit and (b) said analog-to-digital circuit.

9. A logging apparatus according to claim 1 wherein said circuit for sampling comprises:

means for quadrature sampling signals from said at least one receiver at a sampling frequency which is less than said interrogation frequency.

10. A logging apparatus according to claim 1 wherein said circuit sampling comprises:

a sampling circuit for sampling signals from said at least one receiver at a sampling frequency which is determined by said controller member in a manner which reduces aliasing.

11. A logging apparatus for use in interrogating a borehole and surrounding formation, comprising:

a housing;

at least one transmitter antenna carried by said housing;

at least one receiver antenna carried by said housing;

at least one oscillator circuit, which is electrically coupled to said at least one transmitter antenna for selectively energizing said at least one transmitter antenna, which has at least one digital input and an analog output, and which provides an analog output at a particular interrogation frequency in response to a digital command at said at least one digital input;

at least one controller which is electrically coupled to said at least one oscillator circuit through said at least one digital input and which is electrically coupled to said at least one receiver antenna;

a reception circuit including at least one digital output for utilizing said at least one receiver antenna in measuring at least one attribute of at least one of (a) said borehole and (b) said surrounding formation and providing digital data to said at least one controller through said at least one digital output;

said at least one controller being operable in a plurality of modes of operation, including:

(1) a transmission mode of operation, wherein said at least one controller provides a particular digital command signal to said at least one digital input in response to program instructions, to produce an analog signal from said analog output of said at least one oscillator having a particular frequency which is associated with said particular command signal, for energizing said at least one transmitter to initiate propagation of an interrogating electromagnetic field, having an interrogation frequency, through said borehole and surrounding formation; and (2) a reception mode of operation, wherein said at least one controller samples measurements of at least one attribute of said interrogating electromagnetic field, made utilizing said at least one receiver antenna, at a sampling frequency which is less than said interrogation frequency.

12. A logging apparatus according to claim 11:

wherein said at least one oscillator provides an analog signal at said analog output with a predetermined phase attribute which is determined at least in part by said digital signal provided at said at least one digital input.

13. A logging apparatus according to claim 11:

wherein said controller member is operable in the following additional mode of operation:

(3) an analysis mode of operation wherein said at least one controller calculates a value for an attribute of at least one of said borehole and said surrounding formation utilizing said sampled measurements.

14. A logging apparatus according to claim 11:

wherein said at least one receiver antenna comprises at least two receiver antennas;

wherein said controller member is operable in the following additional modes of operation:

(3) an analysis mode of operation, wherein said at least one controller calculates a value for an attribute of at least one of said borehole and said surrounding formation utilizing sampled measurements taken from said at least two receiver antennas.

15. A logging apparatus according to claim 12:

wherein said controller member is operable in the following additional mode of operation:

(3) an analysis mode of operation wherein said at least one controller calculates a value for an attribute of at least one of said borehole and surrounding formation utilizing sampled measurements taken from a single one of said at least one receiver antenna and said predetermined phase attribute which is determined at least in part by said digital signal provided at said at least one digital input.

16. A logging apparatus according to claim 11:

wherein said at least one oscillator provides an analog signal at said analog output with a predetermined amplitude which is determined at least in part by said digital signal provided at said at least one digital input.

17. A logging apparatus according to claim 16:

wherein said controller member is operable in the following additional mode of operation:

(3) an analysis mode of operation wherein said at least one controller calculates a value for an attribute of at least one of said borehole and surrounding formation utilizing sampled measurements taken from a single one of said at least one receiver antenna and said predetermined amplitude attribute which is determined at least in part by said digital signal provided at said at least one digital input.

18. A logging apparatus according to claim 11:

wherein said at least one controller comprises:

a transmission controller for each particular one of said at least one transmitter antenna for providing a particular digital command signal to said at least one digital input of a particular one of said at least one oscillator associated with said each particular one of said at least one transmitter in response to digital commands originating from a central processor.

19. A logging apparatus according to claim 18, further comprising:

a reception controller for continuously sampling said at least one attribute of said interrogating electromagnetic field and for providing measurements to said central processor in response to a digital command.

20. A logging apparatus according to claim 11:

wherein said at least one transmitter antenna comprises a plurality of transmitter antennas;

wherein said at least one receiver antenna comprises a plurality of receiver antennas; and wherein, during said transmission mode of operation, said at least one controller selects particular ones of said plurality of transmitter antennas and said plurality of receiver antennas for inclusion in said transmission mode of operation, thereby selecting a particular transmission path from a plurality of available transmission paths.

21. A logging apparatus for use in a wellbore for determining an attribute of at least one of (a) said wellbore, and (b) a surrounding formation, when coupled to a wellbore tubular and suspended in said wellbore, comprising:

a housing, including means for coupling said housing to said wellbore tubular;

at least one transmitter carried by said housing, each transmitter being individually and selectively operable for producing an electromagnetic interrogating signal at a selected interrogation frequency for passage through said wellbore and said surrounding formation;

at least one receiver, carried by said housing in a selected position relative to said at least one transmitter, each receiver being tuned to receive electromagnetic signals at said interrogation frequency to the exclusion of other frequencies;

wherein a portion of said at least one of (a) said wellbore, and (b) said surrounding formation has an attribute value which can be derived from at least one of (a) amplitude attenuation of said electromagnetic interrogating signal as determined from measurements of said electromagnetic interrogating signal taken through said at least one receiver, and (b) phase shift of said electromagnetic interrogating signal as determined from measurements of said electromagnetic interrogating signal taken through said at least one receiver;

a sampling circuit for sampling signals from said at least one receiver by directly digitizing a signal detected by said at least one receiver at a sampling frequency which is less than said interrogation frequency;

a controller member for (a) selectively energizing said at least one transmitter causing said electromagnetic interrogating signal to pass through said wellbore and said surrounding formation in a particular direction relative to said at least one receiver, (b) for selectively obtaining measurements of said electromagnetic interrogating signal from said at least one receiver with said means for sampling circuit, and (c) determining an accurate measure of said attribute value.

22. A logging apparatus according to claim 21:
wherein said attribute comprises formation resistivity; and
wherein said controller member determines an accurate measure of said formation resistivity.

23. An apparatus according to claim 21, wherein said at least one receiver comprises:
first and second receivers, carried by said housing in a selected position relative to said at least one transmitter, each receiver being tuned to receive electromagnetic signals at said interrogation frequency to the exclusion of other frequencies.

24. A logging apparatus according to claim 21, wherein:
said at least one transmitter comprises first and second transmitters, spaced apart a selected distance on said housing, each transmitter being individually and selectively operable for producing an electromagnetic interrogating signal at a selected interrogation frequency for passage through portions of said wellbore and surrounding formation; and
wherein said at least one receiver comprises first and second receivers, spaced apart a selected distance on said housing in a selected position relative to said first and second transmitters, each receiver being tuned to receive electromagnetic signals at said interrogation frequency to the exclusion of other frequencies.

25. A logging apparatus according to claim 21, further including:
at least one drive circuit, electrically coupled between said at least one transmitter and said controller member, for selectively energizing said at least one transmitter in response to commands from said controller member.

26. A logging apparatus for use in interrogating a borehole and surrounding formation, comprising:
a housing;
at least one transmitter antenna carried by said housing;
at least one receiver antenna carried by said housing;
at least one oscillator circuit, which is electrically coupled to said at least one transmitter antenna for selectively energizing said at least one transmitter antenna, which has at least one digital input and an analog output, and which provides an analog output at a particular interrogation frequency in response to a digital command at said at least one digital input;
at least one controller which is electrically coupled to said at least one oscillator circuit through said at least one digital input and which is electrically coupled to said at least one receiver antenna;
a reception circuit including at least one digital output for utilizing said at least one receiver antenna in measuring at least one attribute of at least one of (a) said borehole and (b) said surrounding formation and providing digital data to said at least one controller through said at least one digital output;
said at least one controller being operable in a plurality of modes of operation, including:
(1) a transmission mode of operation, wherein said at least one controller provides a particular digital command signal to said at least one digital input in response to program instructions, to produce an analog signal from said analog output of said at least one oscillator having a particular frequency which is associated with said particular command signal, for energizing said at least one transmitter to initiate propagation of an interrogating electromagnetic field, having an interrogation frequency, through said borehole and surrounding formation; and
(2) a reception mode of operation, wherein said at least one controller samples measurements of at least one attribute of said interrogating electromagnetic field, made utilizing said at least one receiver antenna, by directly digitizing a signal detected by said at least one receiver antenna at a sampling frequency which is less than said interrogation frequency.

27. A logging apparatus according to claim 26:
wherein said at least one oscillator provides an analog signal at said analog output with a predetermined phase attribute which is determined at least in part by said digital signal provided at said at least one digital input.

28. A logging apparatus according to claim 26:
wherein said controller member is operable in the following additional mode of operation:
(3) an analysis mode of operation wherein said at least one controller calculates a value for an attribute of at least one of said borehole and said surrounding formation utilizing said sampled measurements.

29. A logging apparatus according to claim 26:
wherein said at least one receiver antenna comprises at least two receiver antennas;
wherein said controller member is operable in the following additional modes of operation:
(3) an analysis mode of operation, wherein said at least one controller calculates a value for an attribute of at least one of said borehole and said surrounding formation utilizing sampled measurements taken from said at least two receiver antennas.

30. A logging apparatus for use in a wellbore for determining an attribute of at least one of (a) said wellbore, and (b) a surrounding formation, when said logging apparatus is conveyed into said wellbore, comprising:
a housing;
at least one transmitter carried by said housing, each transmitter being individually and selectively operable for producing an electromagnetic interrogating signal at a selected interrogation frequency for passage through said wellbore and said surrounding formation;
at least one receiver, carried by said housing in a selected position relative to said at least one transmitter, each receiver being tuned to receive electromagnetic signals at said interrogation frequency to the exclusion of other frequencies;
wherein a portion of said at least one of (a) said wellbore, and (b) said surrounding formation has an attribute value which can be derived from at least one of (a) amplitude attenuation of said electromagnetic interrogating signal as determined from measurements of said electromagnetic interrogating signal taken through said at least one receiver, and (b) phase shift of said electromagnetic interrogating signal as determined from measurements of said electromagnetic interrogating signal taken through said at least one receiver;
a sampling circuit for directly sampling signals from said at least one receiver without altering the frequency of the signals from said at least one receiver;

a controller member for (a) selectively energizing said at least one transmitter causing said electromagnetic interrogating signal to pass through said wellbore and said surrounding formation in a particular direction relative to said at least one receiver, (b) for selectively obtaining measurements of said electromagnetic interrogating signal from said at least one receiver with said sampling circuit, and (c) determining a measure of said attribute value.

31. A logging apparatus according to claim 30:

wherein said attribute comprises formation resistivity; and wherein said controller member determines an accurate measure of said formation resistivity.

32. An apparatus according to claim 30, wherein said at least one receiver comprises:

first and second receivers, carried by said housing in a selected position relative to said at least one transmitter, each receiver being tuned to receive electromagnetic signals at said interrogation frequency to the exclusion of other frequencies.

33. A logging apparatus according to claim 30, wherein:

said at least one transmitter comprises first and second transmitters, spaced apart a selected distance on said housing, each transmitter being individually and selectively operable for producing an electromagnetic interrogating signal at a selected interrogation frequency for passage through portions of said wellbore and surrounding formation; and wherein said at least one receiver comprises first and second receivers, spaced apart a selected distance on said housing in a selected position relative to said first and second transmitters, each receiver being tuned to receive electromagnetic signals at said interrogation frequency to the exclusion of other frequencies.

34. A logging apparatus according to claim 30, further including:

at least one drive circuit, electrically coupled between said at least one transmitter and said controller member, for selectively energizing said at least one transmitter in response to commands from said controller member.

35. A logging apparatus according to claim 30, wherein said controller member determines an accurate measure of said attribute value by combining samples.

36. A logging apparatus according to claim 30 wherein said means for sampling signals includes for each of said at least one receiver:

a sample and hold circuit for obtaining samples of measurements from a particular one of said at least one receiver, in response to a digital command signal; and an analog-to-digital circuit for digitizing measurements obtained by said sample and hold circuit in response to a digital command signal.

37. A logging apparatus according to claim 36:

wherein said controller member provides said digital command signal to (a) said sample and hold circuit and (b) said analog-to-digital circuit.

38. A logging apparatus according to claim 30 wherein said means for sampling comprises:

means for quadrature sampling signals from said at least one receiver at a sampling frequency which is less than said interrogation frequency.

39. A logging apparatus according to claim 30 wherein said sampling circuit comprises:

a circuit for sampling signals from said at least one receiver at a sampling frequency which is determined by said controller member in a manner which reduces aliasing.

40. A method of logging a wellbore and determining an attribute of at least one of (a) said wellbore, and (b) a surrounding formation, when coupled to a wellbore tubular and suspended in said wellbore, comprising the method steps of:

locating at least one transmitter in said wellbore, each transmitter being individually and selectively operable for producing an electromagnetic interrogating signal at a selected interrogation frequency for passage through said wellbore and said surrounding formation;

locating at least one receiver in said wellbore in a selected position relative to said at least one transmitter, each receiver being tuned to receive electromagnetic signals at said interrogation frequency to the exclusion of other frequencies;

selectively energizing said at least one transmitter causing said electromagnetic interrogating signal to pass through said wellbore and said surrounding formation in a particular direction relative to said at least one receiver, selectively obtaining measurements of said electromagnetic interrogating signal from said at least one receiver by sampling at a sampling frequency which is less than said interrogation frequency; and determining an accurate measure of said attribute value.

41. A method of logging a wellbore according to claim 40, wherein said step of selectively obtaining measurements comprises:

selectively obtaining unheterodyned measurements of said electromagnetic interrogating signal from said at least one receiver by sampling at a sampling frequency which is less than said interrogation frequency.

42. A method of logging a wellbore according to claim 40, wherein said step of selectively obtaining measurements comprises:

selectively obtaining measurements of said electromagnetic interrogating signal from said at least one receiver by directly digitally sampling at a sampling frequency which is less than said interrogating frequency.

43. A logging apparatus for use in a wellbore for measuring an attribute of at least one of (a) said wellbore, and (b) a surrounding formation, when coupled to a wellbore tubular and suspended in said wellbore, comprising:

a housing, including means for coupling said housing to said wellbore tubular;

at least one transmitter carried by said housing, each transmitter being individually and selectively operable for producing an electromagnetic interrogating signal at a selected interrogation frequency for passage through said wellbore and said surrounding formation;

at least one receiver, carried by said housing in a selected position relative to said at least one transmitter, each receiver being tuned to receive electromagnetic signals at said interrogation frequency to the exclusion of other frequencies;

wherein a portion of said at least one of (a) said wellbore, and (b) said surrounding formation has an attribute value which can be derived from at least one electrical signal attribute resulting from measurements of said electromagnetic interrogating signal taken through said at least one receiver, and (b) mapping of said electrical signal attribute to said attribute of at least one of (a) said wellbone, and (b) a surrounding formation;

a sampling circuit for sampling signals from said at least one receiver at a frequency which is less than the selected interrogation frequency;

a controller member for (a) selectively energizing said at least one transmitter causing said electromagnetic interrogating signal to pass through said wellbore and said surrounding formation in a particular direction relative to said at least one receiver, (b) for selectively obtaining measurements of said electromagnetic interrogating signal from said at least one receiver with said means for sampling, and (c) determining an accurate measure of said attribute value.

44. A logging apparatus according to claim 43:
wherein said attribute comprises formation resistivity; and
wherein said controller member determines an accurate measure of said formation resistivity.

45. An apparatus according to claim 43, wherein said at least one receiver comprises:
first and second receivers, carried by said housing in a selected position relative to said at least one transmitter, each receiver being tuned to receive electromagnetic signals at said interrogation frequency to the exclusion of other frequencies.

46. A logging apparatus according to claim 43, wherein:
said at least one transmitter comprises first and second transmitters, spaced apart a selected distance on said housing, each transmitter being individually and selectively operable for producing an electromagnetic interrogating signal at a selected interrogation frequency for passage through portions of said wellbore and surrounding formation; and
wherein said at least one receiver comprises first and second receivers, spaced apart a selected distance on said housing in a selected position relative to said first and second transmitters, each receiver being tuned to receive electromagnetic signals at said interrogation frequency to the exclusion of other frequencies.

47. A logging apparatus according to claim 43, further including:
at least one drive circuit, electrically coupled between said at least one transmitter and said controller member, for selectively energizing said at least one transmitter in response to commands from said controller member.

48. A logging apparatus for use in a wellbore for determining an attribute downhole, when the logging apparatus is conveyed in the wellbore, comprising:
a tool body;
a transmitter carried by the tool body for transmitting an electromagnetic interrogating signal at a selected interrogating frequency for passage into a formation surrounding the tool body;
a receiver carried by the tool body for (a) receiving electromagnetic signals at the interrogating frequency from the formation which are responsive to the transmitted signals, and (b) providing signals corresponding to the signals received by the receiver from which the attribute can be derived;
a sampling circuit for sampling the signals from the receiver at a sampling rate which is less than the Nyquist rate for the interrogating frequency; and
a controller for determining the attribute from the sampled signals.

49. The logging apparatus according to claim 48, wherein the attribute is selected from a group comprising wellbore resistivity, formation resistivity and dielectric constant.

50. The logging apparatus according to claim 48, wherein the controller member selectively energizes the transmitter at the interrogation frequency within a range of frequencies to cause the electromagnetic signal to pass through the wellbore and the surrounding formation in a particular direction relative to the receiver.

51. The logging apparatus according to claim 48, wherein the receiver is spaced apart from the transmitter.

52. The logging apparatus according to claim 51, wherein the receiver is tuned to receive electromagnetic signals at the interrogation frequency to the exclusion of other frequencies.

53. The logging apparatus according to claim 48, wherein the sampling circuit comprises:
a sample and hold circuit for obtaining samples of signals from the receiver in response to digital command signals; and
an analog-to-digital converter for digitizing samples made by the sample and hold circuit in response to the digital command signals.

54. The logging apparatus according to claim 48, wherein the controller member provides the digital command signals to the sample and hold circuit and to the analog-to-digital converter.

55. The logging apparatus according to claim 48, wherein the sampling circuit comprises a circuit for quadrature sampling the signals from the receiver at a sampling rate which is less than the interrogating frequency.

56. The logging apparatus according to claim 48, wherein the sampling rate is less than the interrogating frequency.

57. The logging apparatus according to claim 48, wherein the interrogating frequency is 2 mega hertz.

58. The logging apparatus according to claim 48, wherein the controller circuit processes the sampled signals to measure a characteristic of the sampled signals, which characteristic is selected from a group comprising phase shift, attenuation and amplitude.

59. The logging apparatus according to claim 58, wherein the controller circuit determines the attribute from the measured characteristic.

60. A logging apparatus for use in a wellbore for determining an attribute downhole, when the logging apparatus is conveyed in the wellbore, comprising:
a tool body;
at least one transmitter carried by the tool body, each transmitter adapted to produce an electromagnetic interrogating signal at a selected interrogating frequency for passage into a formation surrounding the tool body;
a plurality of receivers, said receivers carried by the tool body at positions relative to the at least one transmitter;
a circuit for sampling the signals from each of the receivers at a sampling rate which is less than the Nyquist rate for the interrogating frequency; and,
a controller member for determining the attribute from the sampled signals.

61. A logging apparatus for use in a wellbore for determining an attribute downhole, when the logging apparatus is conveyed in the wellbore, comprising:
a tool body;
a transmitter carried by the tool body for transmitting an electromagnetic interrogating signal at a selected interrogating frequency for passage into a formation surrounding the tool body;
a receiver carried by the tool body for receiving electromagnetic signals at the interrogating frequency from the formation which are responsive to the transmitted signals and providing signals corresponding to the received signals from which the attribute can be derived;

a sampling circuit in the tool body, the sampling circuit receiving signals directly from the receiver and digitizing the received signals without altering the frequency of the received signals; and a controller circuit carried by the tool body, the controller circuit receiving the digitized signals from the sampling circuit, measuring a characteristic of the received signal from the receiver, which characteristic is selected from a group comprising phase, amplitude and attenuation, and determining therefrom the selected attribute.

62. The logging apparatus according to claim 61, wherein the sampling circuit comprises an amplifier for amplifying signals from the receiver prior to any sampling and an analog-to-digital circuit for digitizing the amplified signals.

63. The logging apparatus according to claim 62, wherein the controller circuit comprises a digital signals processor which processes the sampled signals from the sampling circuit and provides signals corresponding to at least one of the characteristics of the receiver signals, wherein the at least one characteristic is selected from a group comprising amplitude of the received signal, attenuation of the received signals relative to transmitted electromagnetic signal, and phase of the received signal relative to a reference signal.

64. The logging apparatus according to claim 63, wherein the controller circuit comprises a computer which processes the signals from the digital signal processor to determine the selected attribute.

65. The logging apparatus according to claim 64, wherein the attribute is resistivity of the formation surrounding the wellbore.

66. A method of determining an attribute downhole by a logging tool when said downhole tool is conveyed into a wellbore, the logging tool having at least one transmitter for transmitting electromagnetic signals into a formation surrounding the wellbore and at least one receiver for receiving signals from the formation that are responsive to the transmitted signals, comprising:

energizing the at least one transmitter to transmit the electromagnetic signals at a selected interrogating frequency into the formation;

receiving signals from the formation by the at least one receiver;

sampling the received signals at a sampling rate which is less than the Nyquist frequency associated with the interrogating frequency; and processing the sampled signals to determine a measure of the attribute.

67. The method according to claim 66, wherein the attribute is selected from a group comprising wellbore resistivity, formation resistivity and dielectric constant.

68. The method according to claim 66, wherein the interrogating frequency is selected from a range of frequencies.

69. The method according to claim 66, wherein processing the sampled signals comprises:

determining a characteristic of the received signals from which the attribute can be determined; and determining from the characteristic a measure of the attribute.

70. The method according to claim 66:

wherein the at least one receiver comprises a plurality of spaced apart receivers carried by the logging tool, each such receiver being tuned to receive signals at the interrogating frequency; and the sampling includes sampling signals from each of the receivers at frequency less than the interrogating frequency.

71. The method according to claim 66 further comprising digitizing the sampled signals prior to processing the signals.

72. The method according to claim 66, wherein the sampling of the received signals comprises:

amplifying the signals received by the at least one receiver;

sampling the amplified signals at a frequency less than the interrogating frequency;

holding the sampled signals; and digitizing the held signals.

73. The method according to claim 66, wherein the sampling is performed in response to command signals having an associated bandwidth that is at least as large as the bandwidth associated with the signals received by the at least one receiver.

74. The method according to claim 66, wherein the interrogating frequency is 2 mega hertz.

* * * * *